US008752840B2

(12) United States Patent
Berman et al.

(10) Patent No.: US 8,752,840 B2
(45) **Date of Patent: *Jun. 17, 2014**

(54) APPARATUS AND METHOD FOR PLAYING POKER-STYLE GAMES INVOLVING A DRAW

(71) Applicant: King Show Games, Inc., Minnetonka, MN (US)

(72) Inventors: Bradley Berman, Minnetonka, MN (US); Erica Berman, Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/732,352

(22) Filed: Dec. 31, 2012

(65) Prior Publication Data

US 2013/0116026 A1 May 9, 2013

Related U.S. Application Data

(60) Continuation of application No. 13/231,230, filed on Sep. 13, 2011, now Pat. No. 8,342,933, which is a division of application No. 10/755,580, filed on Jan. 12, 2004, now Pat. No. 8,016,656.

(51) Int. Cl.
*A63F 1/00* (2006.01)
*A63F 13/00* (2014.01)

(52) U.S. Cl.
USPC ........... 273/292; 273/274; 273/138.2; 463/13

(58) Field of Classification Search
USPC ............ 273/292, 274, 309, 138.2; 463/13, 12
See application file for complete search history.

(56) References Cited

U.S. PATENT DOCUMENTS

| | | | | |
|---|---|---|---|---|
| 5,118,109 | A | 6/1992 | Gumina | |
| 5,407,199 | A | 4/1995 | Gumina | |
| 5,489,101 | A | 2/1996 | Moody | |
| 5,732,950 | A | 3/1998 | Moody | |
| 5,816,916 | A | 10/1998 | Moody | |
| 5,823,873 | A | 10/1998 | Moody | |
| 6,089,976 | A | 7/2000 | Schneider et al. | |
| 6,190,255 | B1 | 2/2001 | Thomas et al. | |
| 6,322,309 | B1 | 11/2001 | Thomas et al. | |
| 6,419,578 | B1 | 7/2002 | Moody et al. | |
| 6,435,500 | B2 * | 8/2002 | Gumina | 273/139 |
| 6,612,927 | B1 | 9/2003 | Slomiany et al. | |
| 6,645,074 | B2 | 11/2003 | Thomas et al. | |
| 8,016,656 | B2 | 9/2011 | Berman et al. | |
| 2004/0082378 | A1 | 4/2004 | Peterson et al. | |
| 2012/0004022 | A1 | 1/2012 | Berman et al. | |

OTHER PUBLICATIONS

Bally Gaming & Systems, "Pick'em Poker Plus", Global Gaming Business, Jun. 2004, p. 46.
King Show Games, Inc., "Listing of Related Cases", Apr. 4, 2013, 1 page.

* cited by examiner

*Primary Examiner* — Benjamin Layno

(57) ABSTRACT

An apparatus and method for enhancing participation in gaming activities that involve replacement items, replacement cards, or other draw-type activity. A player is allowed to hold cards (or other items) of a starting hand/payline. Multiple sets of potential replacement cards are provided, from which the player can select the desired set of replacement cards. The selected set of replacement cards is used to complete the player's hand. Multiple hands may be played concurrently.

20 Claims, 18 Drawing Sheets

APPARATUS AND METHOD FOR PLAYING POKER-STYLE GAMES INVOLVING A DRAW

CROSS-REFERENCE TO RELATED APPLICATIONS

This application is a continuation of U.S. application Ser. No. 13/231,230, filed Sep. 13, 2001, now U.S. Pat. No. 8,342,933, which is a divisional of U.S. application Ser. No. 10/755,580, filed Jan. 12, 2004, now U.S. Pat. No. 8,016,656, both of which are incorporated herein by reference in their entirety.

FIELD

This invention relates in general to games, and more particularly to an apparatus and method for facilitating play in poker-style games involving a draw such as draw poker.

BACKGROUND

Card games such as poker have long been enjoyed by people as a means for entertainment. The popularity of casino gambling with wagering continues to increase, both in live table versions as well as electronic/computer-based casino gaming machines. Whether played in a gaming environment, or in a non-wagering environment such as a computer game, the appeal of card games and other gaming activities is unfaltering.

One particular poker genre involves poker games having a "draw," where replacement cards may be dealt or otherwise provided to the player during play of a hand. For example, in a common variation of draw poker, the player is dealt a number of cards, such as five cards. The player looks at the cards in this initial hand, and decides which cards to hold and which to discard based on the likelihood of achieving a winning hand based on a predetermined pay table. The cards that are discarded are replaced with new cards for use with the held cards to create the resulting hand.

Traditionally, these and other poker games including such a "draw" typically involve the dealer providing the player with the number of cards required to replace the player's discarded cards. In electronic embodiments, a computer-based system such as a video poker machine electronically provides the player with the replacement cards. The ability to receive dealer-furnished replacement cards allows the player to experience additional anticipation and optimism in achieving a winning hand, over non-draw poker games such as stud poker games.

However, such conventional draw poker games are limited in the ability to provide additional excitement and anticipation during play of a poker hand. The player has no control over the draw hand with perhaps the exception of the number of replacement cards that will be provided, which is typically based on the number of cards discarded by the player. With the ongoing need to attract and entertain casino patrons, particularly in today's electronic casino environments, new alluring gaming activities are essential.

The present invention provides a system and method for participating in gaming activities, and more particularly for participating in poker or other gaming activities involving a "draw" or other replacement set of gaming items. The present invention provides added excitement over existing gaming activities, and offers other advantages over prior art gaming approaches.

SUMMARY

To overcome limitations in the prior art described above, and to overcome other limitations that will become apparent upon reading and understanding the present specification, the present invention discloses a system and method for facilitating play in poker-style games involving a draw or other replacement items.

In accordance with one embodiment of the invention, a method for facilitating play in a card game is provided. A starting hand of cards is presented, and the player is allowed to select a number (including zero) of cards to hold from the starting hand. Multiple replacement hands (i.e., multiple sets of one or more replacement cards) are presented to the player, where the player is allowed to select a replacement hand(s). A resulting hand(s) is created using the held cards and the replacement hand(s) selected by the player.

In more particular embodiments of such a method, conditions may be set such that the player is allowed to select from the multiple replacement hands if the condition has been met. The conditions may include any desired conditions, such as conditions based on the poker rank (i.e. card face values and/or suits) of the held cards. In one embodiment, the player is simply provided with replacement cards if the condition is not met. In another embodiment, the condition may be whether the player needs any replacement cards—e.g., the player may hold all cards and may not need any replacement cards.

In one particular embodiment of such a method, a bonus event may be provided to the player if the player has held all cards or otherwise does not need any replacement cards. The bonus event may be any desired bonus event, such as presenting a card(s) to the player, allowing the player to select a card(s) from a plurality of selectable cards, comparing the selected card(s) to the presented card(s), and providing a bonus if the player's selected card has a higher poker rank (or alternatively a lower, or equal poker rank) than the presented card. In other embodiments, the bonus event may involve the player selecting from multiple selectable items, where at least some of the items are associated with a multiplier value, monetary amount, prize, free play, etc.

In another particular embodiment of such a method, the player may be allowed to continue to select replacement hands until some event occurs. For example, the player may be allowed to continue to select replacement hands until the corresponding resulting hand does not result in a winning hand as determined from a pay table. Alternatively, one or more of the selectable replacement hands may be associated with some indicator, whether visual, audible or otherwise, where selection of a replacement hand associated with such an indicator disallows further replacement hand selections by the player.

In accordance with another embodiment of the invention, multiple hands may be concurrently played. In other words, multiple resulting hands may be obtained in parallel. In one embodiment, such multi-hand play is allowed where the player has wagered an additional amount over a single-hand play. One method for providing a card game according to such an embodiment involves presenting at least one starting hand of cards, allowing the player to select (or is assigned) cards to hold from the starting hand, and creating a number of partial resulting hands based on the cards held in the starting hand. Multiple replacement hands are presented, each having one or more respective replacement cards, and the player is allowed to select one or more of the replacement hands. Each of the partial resulting hands is then completed using the replacement cards from the replacement hands selected by the player.

In a more particular embodiment of such a multi-hand embodiment, the various partial resulting hands may be created by duplicating the cards held in the starting hand into each of the partial resulting hands. In another embodiment, cards similar to those cards that are held are used to create at least some of the partial resulting hands. A conversion module may be used to convert the held cards to similar cards, where such similar cards may differ from the held cards in their face values and/or suits. In one embodiment, the similar cards have a poker rank that is similar or equal to the held cards, without the set of similar cards being identical to the held cards.

In accordance with another embodiment of the invention, a method is provided for facilitating play in a game utilizing symbols. Such symbols may be cards as previously described, or may be other symbols such as those used in conventional slot machines. Zero, one or more of a starting set of symbols are held. Multiple sets of replacement symbols are presented, and selection of at least one of the replacement symbols occurs (manually or automatically). A resulting set of symbols is created using the symbols that were held and the set(s) of replacement symbols selected by the player. Such an embodiment may be implemented, for example, using a plurality of sets of selectable reels, where each set of reels includes one or more reels to provide the selectable replacement symbols.

In accordance with another embodiment of the invention, a gaming apparatus is provided for allowing player participation in a gaming activity. The gaming apparatus includes a display device to present at least one starting set of symbols, a plurality of sets of replacement symbols, and at least one resulting set of symbols. A user interface is provided to facilitate player selection of symbols to hold from the starting set of symbols, and to facilitate player selection of at least one of the plurality of sets of replacement symbols. A processing system is configured to create the resulting set(s) of symbols using the symbols held from the starting set of symbols and the set(s) of replacement symbols selected by the player.

In accordance with yet another embodiment of the invention, a method is provided for facilitating play of a card game. The method includes dealing a starting hand of cards to at least one player, and allowing player selection of zero, one or more of the cards to hold from the starting hand. A plurality of player-selectable replacement hands are dealt, and the player is allowed to select at least one of the replacement hands to replace at least some of the cards that were not held by the player. At least one resulting hand is created using the cards held by the player and the at least one replacement hand selected by the player.

In accordance with still another embodiment of the invention, a method is provided for facilitating play of a card game. At least one starting hand of cards is presented, and the player is allowed to select zero, one or more of the cards to hold from the starting hand(s). A plurality of selectable replacement cards is presented. The player is allowed to select a number of the replacement cards until the number of the replacement cards selected by the player at least corresponds to a number of the replacement cards required to complete the at least one starting hand. At least one resulting hand of cards is created using the cards that were held and the replacement cards selected by the player.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described particular representative examples of an apparatus and method in accordance with the invention.

BRIEF DESCRIPTION OF THE DRAWINGS

The invention is described in connection with the embodiments illustrated in the following diagrams.

DETAILED DESCRIPTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides an improved game, such as a card game and/or slot machine game. The invention provides a manner of enhancing participation in gaming activities that involve replacement items, replacement cards, or other draw-type activity. In a draw poker embodiment, the invention allows the player to hold cards of a starting hand if desired. Multiple sets of potential replacement cards are provided, from which the player can select the desired set of replacement cards. The selected set of replacement cards is used to complete the player's hand. The invention allows for multiple hands to be concurrently played, which may involve providing multiple starting hands and/or allowing the player to select multiple sets of the available replacement card sets, thereby resulting in multiple resulting hands. The invention contemplates both electronic and traditional table versions of such gaming activities.

Figure 1:
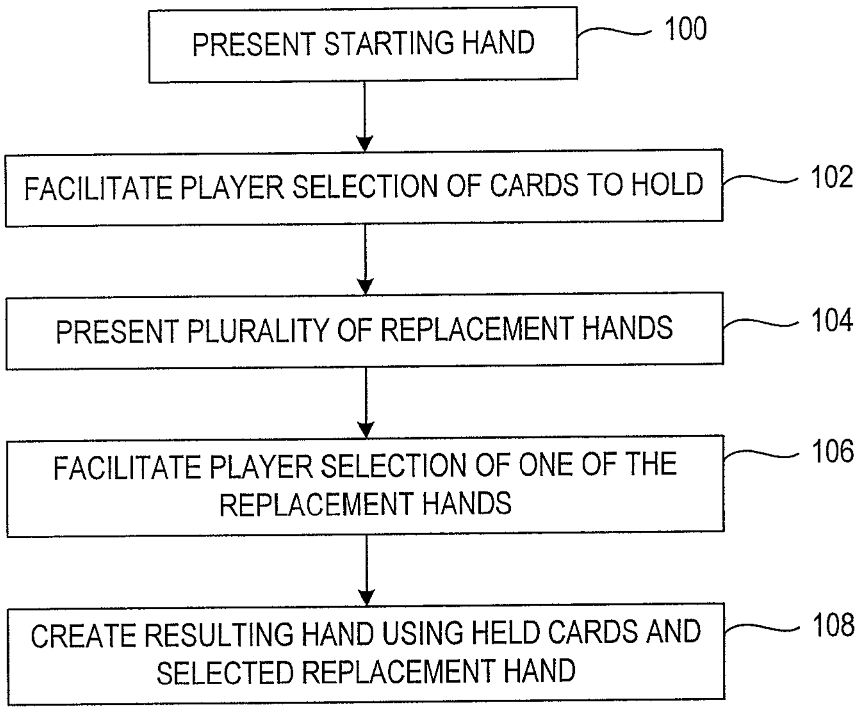
FIG. 1 is a flow diagram illustrating one embodiment of a manner of playing a card game in accordance with the present invention.

FIG. 1 is a flow diagram illustrating one embodiment of a manner of playing a card game in accordance with the present invention. In the illustrated embodiment, a starting hand of cards is presented 100. The cards being "presented" as used herein includes any presentation of physical cards or electronic cards. For example, where physical cards are used, presenting the starting hand of cards may involve dealing the physical cards to the player(s). Where the invention is embodied in an electronic environment such as a casino gaming machine, computer-based gaming activity or other electronic embodiment, presenting the cards involves displaying representations of cards (e.g., displaying representations of playing cards on a display) or otherwise presenting information identifying what the cards may be (e.g., text such as "5C" identifying a five of clubs; audio presentations; etc.). The invention contemplates any presentation of the cards that adequately identifies the cards. Thus, for purposes of the description provided herein, terms such as cards being "presented," "dealt" or the like include physical and/or electronic presentations of the cards unless otherwise indicated.

It is further noted that other indicia may be used rather than playing cards, such as symbols. For example, a pay table may be provided that includes symbols (e.g., cherries, oranges, plums, bars, "sevens," stars, or any other predetermined symbols), where a pattern of symbols is used to determine the value of the resulting hand in a manner analogous to that of playing cards. For example, four star symbols may correspond to the highest "poker" rank in a manner analogous to that of four Aces. Five red symbols may correspond to payouts analogous to that of a flush where cards are used. Such symbols may be provided on physical media analogous to that of cards, or may be provided via an electronic device such as a slot machine. Thus, while a preferred embodiment involves the use of playing cards or playing card images, any predetermined symbol combinations may be used in an analogous manner in accordance with the present invention.

The starting hand may include any number of cards. For example, in a five-card draw poker game, the starting hand may include five cards, although other poker variations may begin with a greater or lesser number of cards. Further, in one embodiment of the invention, each of the cards of the starting hand are dealt (i.e., presented) face up. In other embodiments of the invention, one or more of the cards of the starting hand may be dealt face down. The latter embodiment may be particularly useful in a multi-player table version of the game, or a multi-player electronic version of the game, where the players compare their respective resulting hands to determine the winning hand and the bets are made against each other rather than against the house.

The game illustrated in FIG. 1 includes facilitating player selection of starting hand cards to hold, as shown at block 102. For example, in an electronic embodiment such as a computer-implemented or casino gaming apparatus, the system provides a manner in which the player can identify which, if any, cards of the starting hand to hold. One such manner is through the user of user interface (UI) mechanisms in which the cards that are to be held can be identified by the player. In a table version of the game, the player can identify cards to be held in any conventional manner. The player may hold any number of the cards, such as zero, one, or more up to all of the cards in the starting hand. Further, facilitating player selection of cards to hold from the starting hand may involve the system (or dealer in a live game) automatically identifying the cards to hold from the starting hand. This identification of the cards to hold may include highlighting the most appropriate cards for the player to then hold, and/or actually effecting the hold of the cards.

A plurality of replacement hands are presented 104. For purposes of the description provided herein, a replacement "hand" refers to a set of replacement cards—i.e., a draw. A replacement "hand" therefore does not suggest a full poker hand (although it may), but rather refers to one or more replacement cards that may be fully or partially used to replace discarded cards and/or to furnish other additional cards used in the creation of a resulting hand. For example, a player may hold two cards in a five-card starting hand, where a replacement "hand" includes three cards to replace the non-held (i.e., discarded) cards. Further, a player's starting hand may include fewer cards than are used in a corresponding resulting hand, in which case a replacement hand may also include cards to contribute to the completion of the resulting hand. For example, a starting hand may include three cards, where the player holds all three cards. A plurality of replacement hands of two cards (assuming a five-card resulting hand(s)) may then be presented. Further, each of the plurality of replacement "hands" may include the same number of replacement cards as the other selectable replacement hands, or may include different numbers. For example, where the player holds two cards of a five-card starting hand, one of the plurality of replacement hands may include three replacement cards, while another may include four replacement cards allowing the player to select the best three cards of the four replacement cards. These examples are provided as representative examples only, and it should be recognized that a replacement hand may include any set or subset of cards that are, or are potentially, used to contribute to the ultimate resulting hand(s).

One embodiment of the invention involves presenting 104 each of the cards of each of the plurality of replacement hands face down, although other embodiments may provide one or more of the cards in one or more of the plurality of replacement hands face up. In one embodiment, the number of replacement cards associated with each of the plurality of replacement hands corresponds to the number of starting hand cards that were not held by the player. For example, if the starting hand includes five cards and the player held two cards, each of the plurality of replacement hands will include three cards. In another embodiment, the number of replacement cards associated with each of the plurality of replacement hands corresponds to the difference of the number of cards in the resulting hand and the number of cards held by the player. For example, if the number of cards in the resulting hand is three and the number of cards held by the player was two, each of the plurality of replacement hands will include one card. Any number of different variations are possible, depending on the particular rules of the poker game being played. Further, the selectable replacement hands may be presented as sets of actual replacement cards, or may be presented in other manners, such as selectable items (e.g., items 1-5, where each item represents a different selectable replacement hand, etc.).

In accordance with the illustrated embodiment, player selection of one of the replacement hands is facilitated 106. For example, in an electronic embodiment, one or more UI mechanisms may be made available to the player to select the desired replacement hand. As will be described more fully below, other embodiments of the invention allow player selection of more than one of the plurality of replacement hands.

When the player has selected the desired replacement hand, a resulting hand is created 108 using the player's held cards and at least some of the cards of the selected replacement hand. For example, a five-card resulting hand may be created using the player's two held starting hand cards in connection with the player's selected three-card replacement hand.

As can be seen from the embodiment illustrated in FIG. 1, one embodiment of the present invention involves a draw poker game where the player optionally holds cards of a starting hand, and is then afforded an opportunity to pick the replacement cards from a plurality of possible replacement hands to form the player's resulting hand. This adds excitement and provides the player with a feeling of involvement in the outcome of his/her resulting hand, and in some embodiments allows the player to see the non-selected replacement hands/cards to see what the player might have attained had the player selected different replacement hands/cards.

The number of cards associated with the starting hand may or may not correspond to the number of cards in any resulting hand as it exists after the inclusion of any replacement/draw cards. For example, in one embodiment of the invention, the starting hand includes X cards, and after the player holds cards and receives replacement cards, the resulting hand also includes X cards.

The starting hand may include more than the number of cards in the resulting hand. For example, assuming a five-card draw poker game, the player may be provided six cards in a starting hand, and is allowed to hold zero, one or more cards up to five cards. Assume the player holds three cards, and a plurality of two-card replacement hands are dealt from which the player may make his/her replacement hand selection. The resulting hand would include five cards, although the starting hand included six cards.

In another embodiment of the invention, the starting hand includes less than the number of cards in any such resulting hand. For example, where the starting hand includes X cards, the resulting hand may include X+Y cards where $Y \geq 1$. As a more particular example of such an embodiment, assume the starting hand includes four cards (X=4) and the resulting hand includes five cards (X+Y=5; Y=1). Similarly, the starting hand could include three cards (X=3) and the resulting hand includes five cards (X+Y=5; Y=2), and so forth. Such an embodiment is particularly beneficial in connection with one embodiment of the present invention, as it assures that at least one replacement card will be required, and thus ensures the opportunity for the player to select a replacement hand from a plurality of replacement hands. More particularly, if a player holds all cards of a starting hand of X cards, but the resulting hand includes X+Y cards, the player will need at least Y replacement cards to complete the resulting hand. The player will therefore be provided with a plurality of replacement hands from which the player's replacement hand will be selected, even though each of the plurality of selectable replacement hands may include as few as one card. Alternatively if the player holds none of the cards of the starting hand, the plurality of replacement hands in such an embodiment would each include a number of cards corresponding to the number of cards of the resulting hand. For example, if the player holds none of the cards provided in a four-card starting hand, each of the plurality of selectable replacement hands will include five cards where the resulting hand is a five-card poker hand.

In another embodiment, the player may only be allowed the option to select a replacement hand(s) among a plurality of replacement hands if one or more certain conditions occur. For example, where the player receives a starting hand having a poker rank below a predetermined poker rank (e.g., less than a pair, a pair or less, etc.), the player may simply receive a replacement hand without being afforded an opportunity to select a replacement hand from a plurality of replacement hands. Alternatively, if the player receives a starting hand having a poker rank higher than a predetermined threshold, the player may then qualify for selecting a replacement hand from a plurality of replacement hands. In another embodiment, being awarded the opportunity to select from a plurality of replacement hands may occur where the player's starting hand is less than the poker rank threshold. Conditions other than poker rank may be used in an analogous manner.

As previously indicated, other indicia may be used rather than playing cards, such as symbols. The embodiment of FIG. 1 is therefore applicable to embodiments utilizing symbols, such as slot machine symbols. For example, a starting set of symbols may be presented, from which the player may select (or be provided with) one or more symbols to retain. A plurality of available replacement symbols for those not selected/provided may then be provided. For example, in the slot machine context, a plurality of sets of spinning reels may be provided, where in one embodiment the number of spinning reels in each set corresponds to a number of symbols required to complete the starting set of symbols to create the resulting set of symbols. In other embodiments, the number of symbols associated with each selectable reel set may exceed the number of symbols required to complete the starting set of symbols to create the resulting set of symbols, thus allowing some but not all of the symbols associated with a selected reel set to be used in the creation of the resulting symbol set. In yet other embodiments, the number of symbols associated with reel sets may be less than the number of symbols required to complete the starting set, whereby the player may be allowed to select multiple reel sets to ultimately create the resulting symbol set. In any event, the player selects the desired replacement symbol set(s), and the resulting symbol set is thus created.

Figure 2:
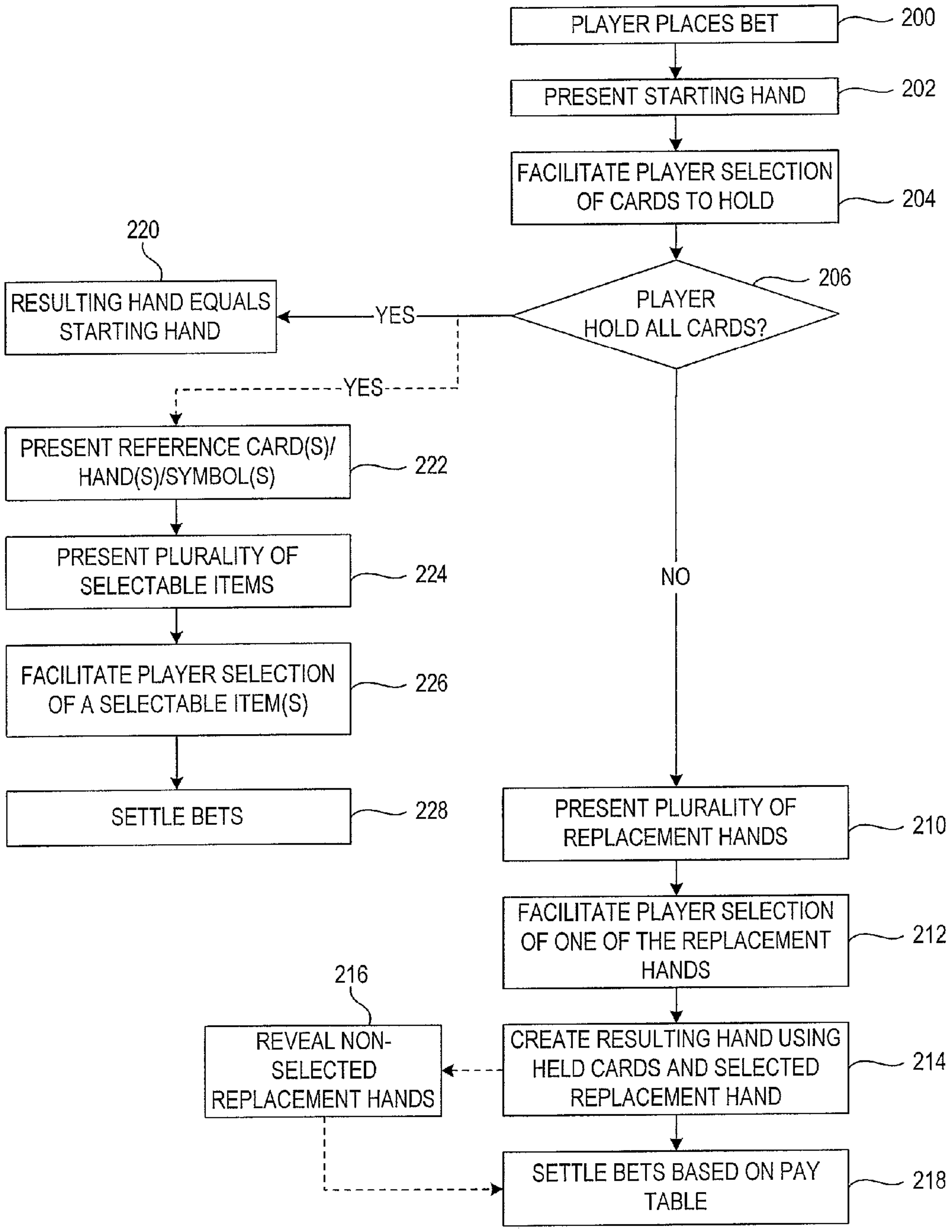
FIG. 2 is a flow diagram illustrating one embodiment of a poker game according to the present invention where different activities may occur depending on the number of cards held in the starting hand.

FIG. 2 is a flow diagram illustrating one embodiment of a poker game according to the present invention where different activities may occur depending on the number of cards held in the starting hand. In the illustrated embodiment, the player places a bet 200, and is presented 202 with a starting hand. As will be discussed in greater detail below, some embodiments of the invention involve presenting the player with more than one starting hand. However, for purposes of description, the embodiment of FIG. 2 is described in terms of a single starting hand, although the principles described herein are equally applicable to multiple starting hand embodiments.

The player is allowed to select cards of the starting hand to hold, as shown at block 204. If the player holds no cards or a number of cards less than all of the cards in the starting hand as determined at decision block 206, the player is presented 210 with a plurality of replacement hands from which a selection 212 can be made. When the player has selected the desired replacement hand, a resulting hand is created 214 using the player's held cards and the cards of the selected replacement hand. In one embodiment, the cards of the non-selected replacement hands may be revealed 216 to the user. Based on a comparison of the resulting hand and at least one pay table, the bets may be settled 218. For example, if the pay table indicates that a pair of Jacks or better return two credits and the player's resulting hand produces a pair of Queens, the player will be awarded two credits.

Table 1 shows a representative embodiment of such a pay table that may be used in connection with the present invention. The number of credits associated with any particular winning combination may be determined in advance. Any predetermined pay table(s) may be used in connection with the present invention, and the representative pay table shown in Table 1 is shown for purposes of illustration only.

TABLE 1

| Poker Rank | | |
|---|---|---|
| Hand | Example | |
| Royal Flush | A, K, Q, J, 10 | (suited) |
| Straight Flush | 3, 4, 5, 6, 7 | (suited) |
| Four Of A Kind | 8, 8, 8, 8, 5 | |
| Full House | 10, 10, 10, J, J | |
| Flush | 3, 6, 8, J, Q | (suited) |
| Straight | 5, 6, 7, 8, 9 | (unsuited) |
| Three Of A Kind | Q, Q, Q, 2, 3 | |
| Two Pair | A, A, J, J, 10 | |
| One Pair | Q, Q, 4, 5, 9 | |
| High Card In Hand | A, Q, 4, 5, 8 | |

In the example of Table 1, each of the various hands may then be associated with a payout amount. For example, in one embodiment, no payout may be awarded until the player's resulting hand(s) reaches, one pair, two pair, or any other predetermined minimum threshold. As a more particular example, it may be required to obtain a pair of Jacks (not shown) or better in order to receive any payout. Any desired hand/payout combinations may be utilized in accordance with the present invention.

One embodiment of the present invention involves allowing the player to select one or more replacement hands from a group of available replacement hands. However, in draw poker games, the player is not required to "discard" any cards, and therefore may opt to hold all cards of the starting hand. For example, if the player received five cards of the same suit (e.g., five diamonds), the player may opt to hold all five starting hand cards to preserve the flush. If the player holds all cards of the starting hand as determined at decision block 206, the resulting hand may simply equal the starting hand as shown at block 220. In such an embodiment, this situation may simply involve bypassing the player's selection of any replacement hands, as no replacement hands are needed.

In accordance with other embodiments of the invention, the player may be presented with other items from which to select, that will not affect the player's held starting hand. For example, in one embodiment where the player holds all cards of the starting hand, one or more reference cards, hands, symbols, or the like may be presented 222 to the player. As a first example, such a reference item may be a single card. This card may be a predetermined card, such as an Eight of any suit. In another embodiment, such a card may be randomly generated, such that it may range from a Two to an Ace. In any case, presenting such a card can provide a way to allow the player to make a selection of items, although such a selection will not be for replacement cards to replace discarded cards of the starting hand. A plurality of selectable items is then presented 224 to the player. The player is then allowed to select at least one of the selectable items as shown at block 226. Assuming the initial presented reference item is a card having a poker rank of Eight, and the player is presented with five selectable cards (i.e., selectable items), the player may select one of those items. In one embodiment, if the selected item is higher than the reference card of Eight, the player may be provided some additional award above and beyond the award for the player's resulting hand. For example, if the player's selected card is higher than the reference card, the player's award for the resulting hand may be doubled, tripled, etc. If the player's selected hand is lower than the reference card, the player may receive no such multiplier, or in another embodiment may lose any award associated with the player's resulting hand. In any event, the bets are settled 228.

The example above represents just one example of how a player may be allowed to make some selection even though the player chose to hold all cards of the player's starting hand. Any type of bonus event may be provided, and may be used in connection with the present invention. As another example, no reference card/hand/symbol may be presented 222, but rather a plurality of selectable items 224 are presented where each of the selectable items includes a multiplier value, such as 1× (i.e., multiply award from resulting hand by one), 2× (i.e., multiply award from resulting hand by two), etc. The selectable items may include other prizes, awards, free plays (e.g., next received starting hand requires no further wager by player), coupons, play tickets, etc. The selectable items may also include replacement resulting hands, thereby allowing the player to trade his/her current resulting hand(s) for a different resulting hand(s) which may or may not have cards partially exposed. Thus, such an embodiment involves providing the player with a selectable bonus event when the player has opted to hold all cards in the starting hand, or otherwise when the player needs no replacement cards for his/her starting hand.

In yet another embodiment, the player may automatically be awarded a bonus if the player chose to hold all cards in the starting hand, or otherwise does not need to obtain any replacement cards. For example, if the player has paid an additional amount to be allowed to select multiple replacement hands or if the particular game rules allow multiple replacement hands to be selected, the player may automatically win a bonus that is dependent on the number of replacement hands that would have been allowed to be selected. For example, in an embodiment involving multiple resulting hands (described more fully below), the player may be allowed to make additional wagers for each resulting hand that the player is allowed to select. The selected resulting hands may each be used in the creation of a resulting hand. If the player holds all of the cards of the starting hand or otherwise does not need any replacement cards, the player may automatically be awarded a bonus. In a more particular example, the player may be awarded the payout value of the resulting hand (which in this example will be the same as the starting hand with all cards held), and will be awarded this payout value a number of times commensurate with the number of replacement hands that the player could have selected had replacement cards been required. For example, if the player would have been allowed to select three replacement hands (due to additional wagers or otherwise), and the player opted to hold all cards of the starting hand, the player may win the payout for the hand three times, since three replacement hand selections would have been made to the player had they been needed. In another embodiment, a multiplier may be provided as a bonus, where the multiplier may, or may not, be dependent on the number of replacement hand selections available to the player. Any such type of bonus event may be used in connection with the present invention.

Figure 3:
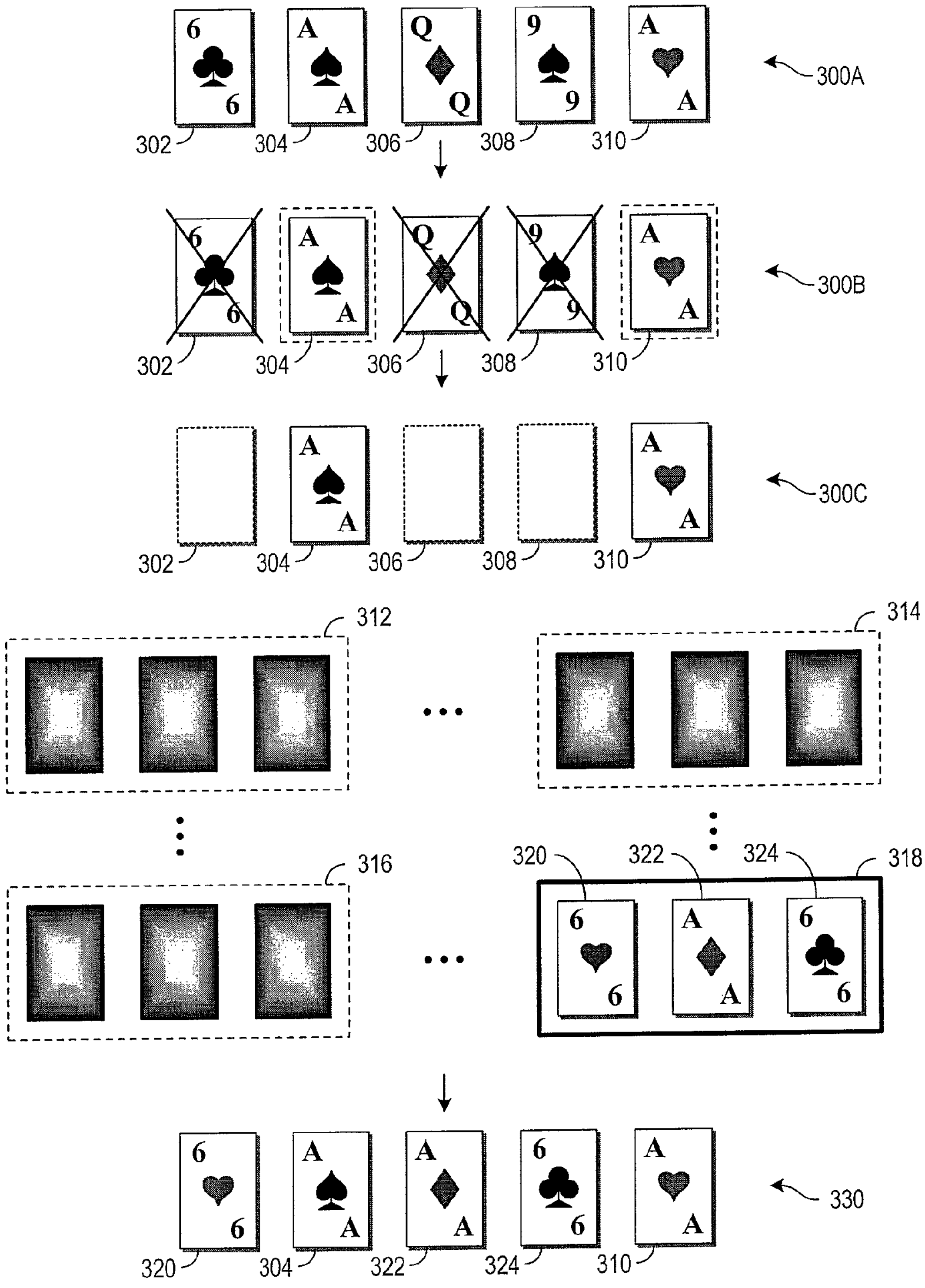
FIG. 3 illustrates a representative example of one embodiment of the present invention, involving a single starting hand in a draw poker environment.

FIG. 3 illustrates a representative example of one embodiment of the present invention, involving a single starting hand in a draw poker environment. A starting hand 300A is dealt to the player. As previously indicated, the starting hand cards may be physically presented/dealt to the player, or alternatively the starting hand may be presented/dealt in an electronic embodiment by electronically presenting the starting hand to the player. In the illustrated embodiment, the starting hand 300A includes five cards 302, 304, 306, 308, 310, although other numbers of cards may be used for the starting hand. Starting hand 300B represents the same starting hand 300A, but at a later stage of activity. As shown at starting hand 300B, the player has opted to hold cards 304 (A-spades) and 310 (A-hearts), and discard cards 302, 306 and 308. Thus, the state of the starting hand 300C is a pair of Aces, with replacement cards required for three cards (assuming a five-card resulting hand).

In accordance with the present invention, a plurality of replacement hands is provided, to allow the player to select which of the available replacement hands to use in establishing the player's resulting hand. In the illustrated embodiment, four replacement hands 312, 314, 316, 318 are presented to the user, although a different number may be used. In one embodiment of the invention, the number of cards associated with each of the selectable replacement hands corresponds to the number of cards discarded by the player. Thus, in the illustrated embodiment the player discarded three cards, and therefore each replacement hand includes three cards to replace the discarded cards.

Each of the cards associated with each of the replacement hands 312, 314, 316, 318 are originally dealt face down in the illustrated embodiment, although in other embodiments one or more of the cards in various replacement hands may be presented face up. FIG. 3 shows that the player has selected replacement hand 318, and after selection the cards 320, 322, 324 of the selected replacement hand 318 are turned face up to expose the cards 320 (6-hearts), 322 (A-diamonds), and 324 (6-clubs). Using the selected replacement hand 318, the resulting hand 330 can be created. The resulting hand 330 includes the held cards 304, 310, as well as the selected replacement cards 320, 322, 324. In the illustrated embodiment, the player's resulting hand is a full house, with Aces (304, 310, 322) and Sixes (320, 324).

In one embodiment, the cards of the non-selected replacement hands 312, 314, 316 may optionally be exposed after the player has completed selecting a replacement hand(s). This may show to the player what the player's resulting hand 330 would have been had the player selected one of the other replacement hands 312, 314, 316.

Figure 4A:
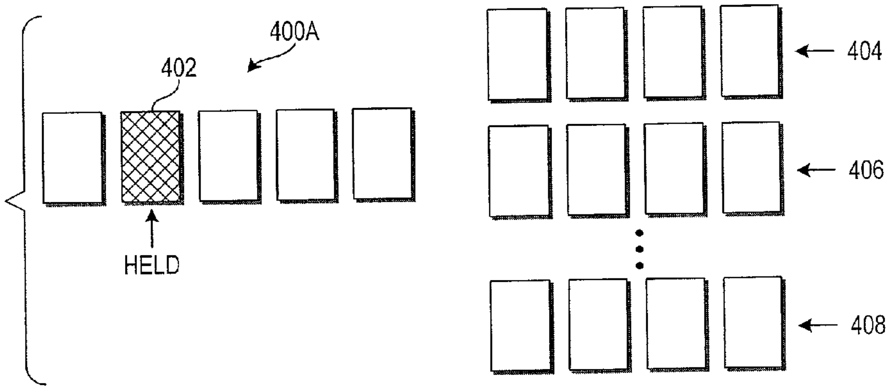
FIGS. 4A, 4B and 4C illustrate one embodiment of the invention where each of the replacement hands includes a number of cards corresponding to the number of cards that were not held by the player.
Figure 4B:
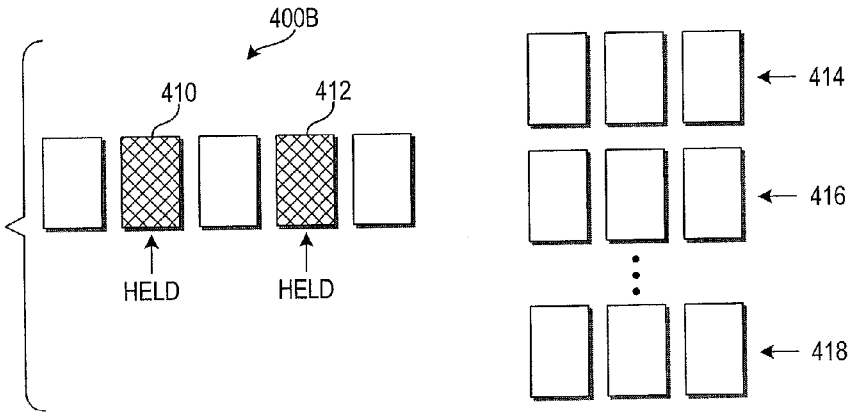
Figure 4C:
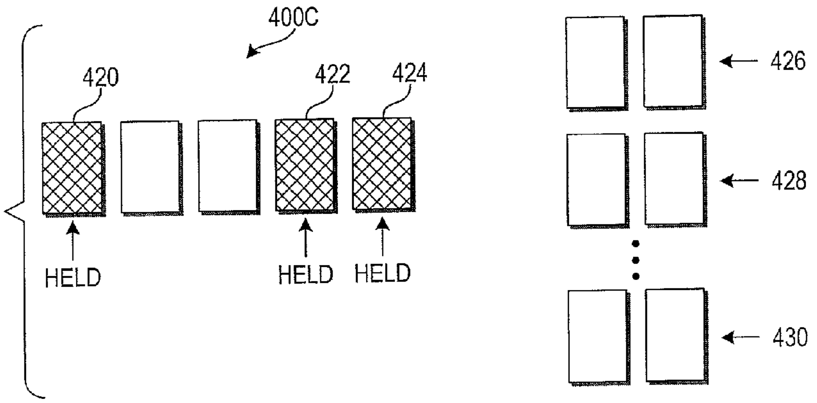

As previously described, one embodiment of the present invention involves an n-card draw poker game, where the number of replacement cards in each of the selectable replacement hands corresponds to the number of cards of the starting hand that were not held by the player. FIGS. 4A, 4B and 4C illustrate one embodiment of the invention where each of the plurality of replacement hands includes a number of cards corresponding to the number of cards that were not held (e.g., were discarded) by the player. For FIGS. 4A, 4B and 4C, it is assumed that a five-card draw poker game is played, where both the starting and resulting hands include five cards.

Referring first to FIG. 4A, a five-card starting hand 400A is presented to the player. The player holds one card, namely card 402. Thus, each of the selectable replacement hands 404, 406, . . . 408 includes four cards. In FIG. 4B, the five-card starting hand 400B is presented, and the player holds two cards, namely cards 410, 412. Thus, each of the selectable replacement hands 414, 416, . . . 418 includes three cards. Similarly, the five-card starting hand 400C of FIG. 4C is presented, and the player holds three cards, namely cards 420, 422, 424. In this case, each of the selectable replacement hands 426, 428, . . . 430 includes two cards.

In an alternative embodiment, the player may be presented with a starting hand(s) that includes less than the number of cards in the resulting hand. For example, in a five-card draw poker game where the resulting hand includes five cards, the starting hand may include four cards, three cards, etc. In such an embodiment, the number of replacement cards in each replacement hand includes the difference between the number of cards in the resulting hand (e.g., five) and the number of cards held by the player. Thus, the number of cards in each replacement hand may not correspond to the number of cards "discarded" by the player where the number of cards in the starting and resulting hands are not the same.

In still other embodiments, the number of cards in one, more, or all of the selectable replacement hands may include more cards than are needed to complete the resulting hand. For example, referring briefly to FIG. 4C, if the player holds three cards, the number of replacement cards in one, more or all of the selectable replacement hands 426, 428, . . . 430 may include three cards, four cards, etc. In such an embodiment, the player may be allowed to select the most beneficial cards of the selected replacement hand. In other words, the player may select a replacement hand, and may use a subset of the set of cards associated with that replacement hand to complete the player's resulting hand.

Figure 5:
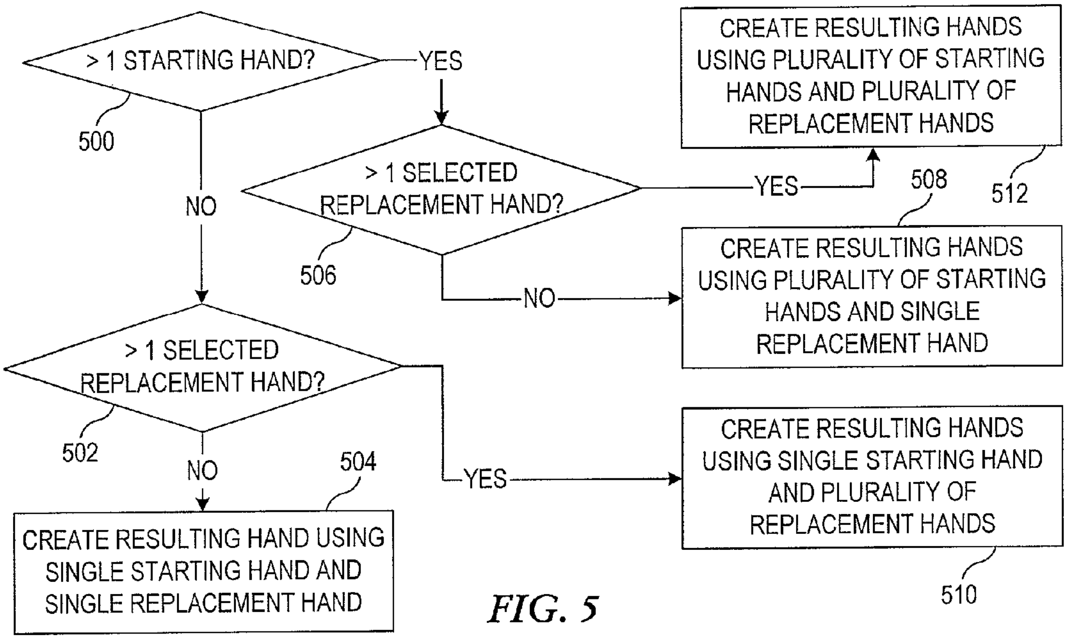
FIG. 5 is a flow diagram illustrating various alternative games in accordance with the present invention, depending on the number of starting hands and/or selected replacement hands utilized.

In accordance with other embodiments of the invention, multiple starting hands and/or selected replacement hands may be utilized. Various different embodiments result depending on whether more than one starting hand is used, and/or whether more than one selected replacement hand is used. FIG. 5 is a flow diagram illustrating various alternative games in accordance with the present invention, depending on the number of starting hands and/or selected replacement hands utilized. If the number of starting hands is not greater than one as determined at decision block 500, and the number of selected replacement hands is not greater than one as determined at decision block 502, then a resulting hand is created 504 using the single starting hand and single selected replacement hand. Such an embodiment corresponds, for example, to the embodiment described in connection with FIG. 3.

However, the present invention also includes embodiments where multiple resulting hands are created. The game may be established such that multiple resulting hands are always provided, or alternatively the player may opt to play multiple games (involving multiple resulting hands) where the player places additional wager amounts to qualify for such multiple hand embodiments. In either case, the present invention may involve multiple starting and/or selected replacement hands to create multiple resulting hands.

In one embodiment, a plurality of starting hands are presented to the player, but the player is allowed to select only one of the plurality of presented replacement hands. This is shown in FIG. 5, where the number of starting hands presented to the player is greater than one as determined at decision block 500, but the number of replacement hands selected by the player is not greater than one as determined at decision block 506. This results in creating 508 a plurality of resulting hands using the plurality of starting hands and the single selected replacement hand. Such an embodiment may be implemented, for example, by dealing a plurality of starting hands to the player, such as three starting hands. In one embodiment, the player selects cards to hold from one of the plurality of starting hands, and the held cards are duplicated into the other starting hands. In another embodiment, the player selects cards to hold from one of the plurality of starting hands, and cards having a predetermined relationship or similarity to the held cards are provided in the other starting hands. Using cards having a predetermined relationship or similarity to the held cards in one hand is described more fully below.

Whether similar or exact cards are provided in the other starting hands, such other starting hands may all be presented face up, or one or more of the starting hands may be presented face down. For example, in one embodiment, all of the plurality of starting hands are dealt face up, and the player can select one of the starting hands to hold cards. In another embodiment, one of the starting hands is dealt face up, while the others are dealt face down. In this embodiment, the player selects the cards to hold from the face-up starting hand, and the held cards are duplicated into the other starting hands, or cards having a predetermined similarity to the held cards are provided in the other starting hands.

It should also be recognized that different combinations of the above-identified manners for providing face-up and face-down starting hands, and the manner of providing cards in other starting hands, may be utilized in accordance with the present invention.

In another embodiment, one starting hand is presented to the player, but the player is allowed to select more than one of the plurality of presented replacement hands. This is shown in FIG. 5, where the number of starting hands presented to the player is not greater than one as determined at decision block 500, but the number of replacement hands selected by the player is greater than one as determined at decision block 502. This results in creating 510 a plurality of resulting hands using the single starting hand and a plurality of selected replacement hands. Such an embodiment may be implemented, for example, by dealing one starting hand to the player, and allowing the player to hold zero, one or more cards of the starting hand. Assume the player holds three cards, then a plurality of replacement hands are presented, and the user is afforded the opportunity to select more than one of the plurality of presented replacement hands. In such an embodiment, each of the selected replacement hands is used in connection with the held cards from the single starting hand to produce a plurality of resulting hands. The player may win or lose on each of the plurality of resulting hands, as determined by comparison of each resulting hand to a pay table(s).

In still another embodiment, a plurality of starting hands are presented to the player, and the player is allowed to select more than one of the plurality of presented replacement hands. This is again shown in FIG. 5, where the number of starting hands presented to the player is greater than one as determined at decision block 500, and the number of replacement hands selected by the player is greater than one as determined at decision block 506. This results in creating 512 a plurality of resulting hands using some combination of the plurality of starting hands and the plurality of selected replacement hands. For example, assume the player is dealt two starting hands, and holds cards in each starting hand. The cards may be held individually in each starting hand, held in at least one starting hand and duplicated into the other starting hands, held in at least one starting hand and cards having a predetermined relationship/similarity to the held cards provided in the other starting hands, etc. The multiple replacement hands selected by the player from the plurality of available replacement hands may then be used with the plurality of starting hands to create the plurality of resulting hands. In one embodiment, a selected replacement hand may be designated for use for a corresponding one of the starting hands. For example, where two starting hands are provided and the player selects two replacement hands, one of the replacement hands may be used in a first of the starting hands, while the other of the replacement hands may be used in the second of the starting hands. Alternatively, the selected replacement hand having the best poker rank may be used in all of the plurality of starting hands. In yet other embodiments, each of the selected replacement hands may be used with a plurality, or all, of the starting hands. For example, assume the player starts with two starting hands, and is allowed to select three replacement hands. One embodiment of the invention provides for each of the three selected replacement hands being used with each of the two starting hands, thereby providing six resulting hands. Such an embodiment may be used whether cards are held in a single starting hand and duplicated or converted into other starting hands, or where cards are independently held in all or some plurality of the starting hands. Any desired variation may be used, where the selected replacement hands are in some predetermined or random manner incorporated with the starting hands to create the plurality of resulting hands.

Figure 6:
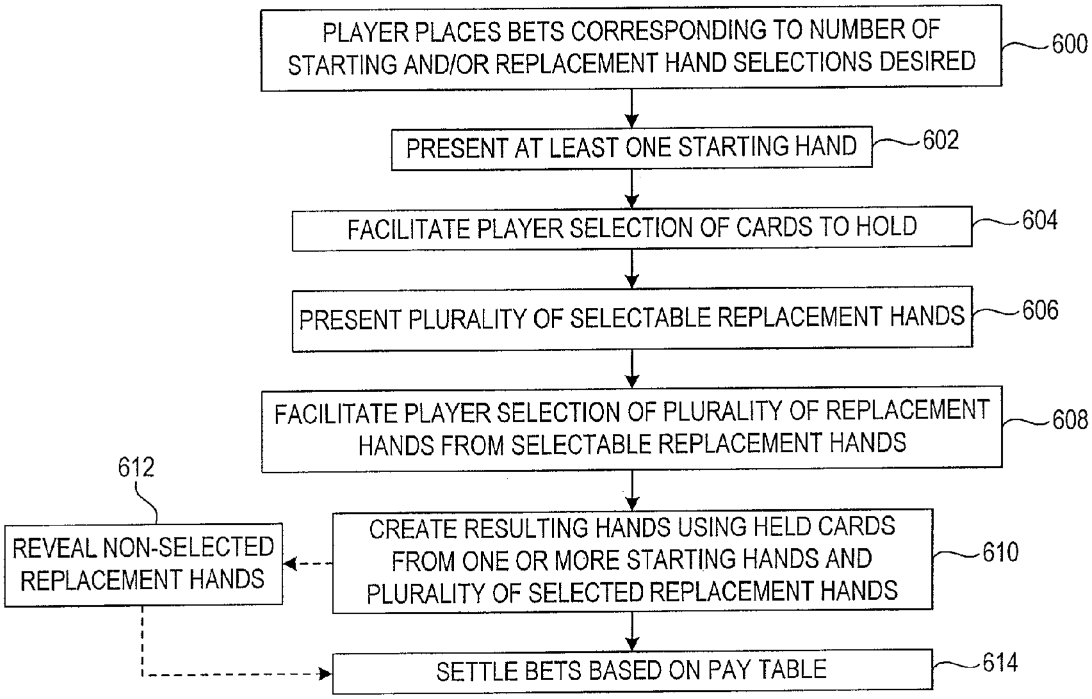
FIG. 6 is a flow diagram illustrating a manner of providing a multi-hand poker game in accordance with one embodiment of the present invention.

FIG. 6 is a flow diagram illustrating a manner of providing a multi-hand poker game in accordance with one embodiment of the present invention. In the illustrated embodiment, the player places bets as shown at block 600. The player may place bets corresponding to the number of starting and/or replacement hand selection desired, as described in connection with FIG. 5. For example, the player may place a particular wager for each of the starting hands to be played through to a resulting hand. Alternatively, or in addition, the player may place a particular wager for each number of replacement hand selections desired. Thus, the player is presented 602 with at least one starting hand, and possibly more if the player has opted for more starting hands, or if the particular game automatically includes multiple starting hands. As shown at block 604, the player is allowed to select cards to hold. Holding cards may be conducted as previously described; i.e., individually in particular starting hands, through duplication of held cards into other starting hands, and/or by providing cards having a predetermined relationship or similarity to the cards held in one or more of the other starting hands.

The player is then presented 606 with a plurality of selectable replacement hands. In the illustrated embodiment, the player is allowed to select more than one of the plurality of selectable replacement hands, as shown at block 608. For example, the player may be allowed to select "x" replacement hands from "n" selectable replacement hands, where n>x in one embodiment of the invention. In another embodiment of the invention, the player may be allowed to select up to all of the selectable replacement hands. For example, “n” may equal ten, and the player is allowed to select one to ten selectable replacement hands depending on the amount wagered by the player.

Resulting hands are then created 610 using the held cards from one or more starting hands and the plurality of selected replacement hands. Such resulting hand creation may be effected in various manners, such as those described in connection with FIG. 5. The non-selected replacement hands may optionally be revealed 612 to the player, and in either case the bets are settled 614 based on a pay table(s).

Figure 7:
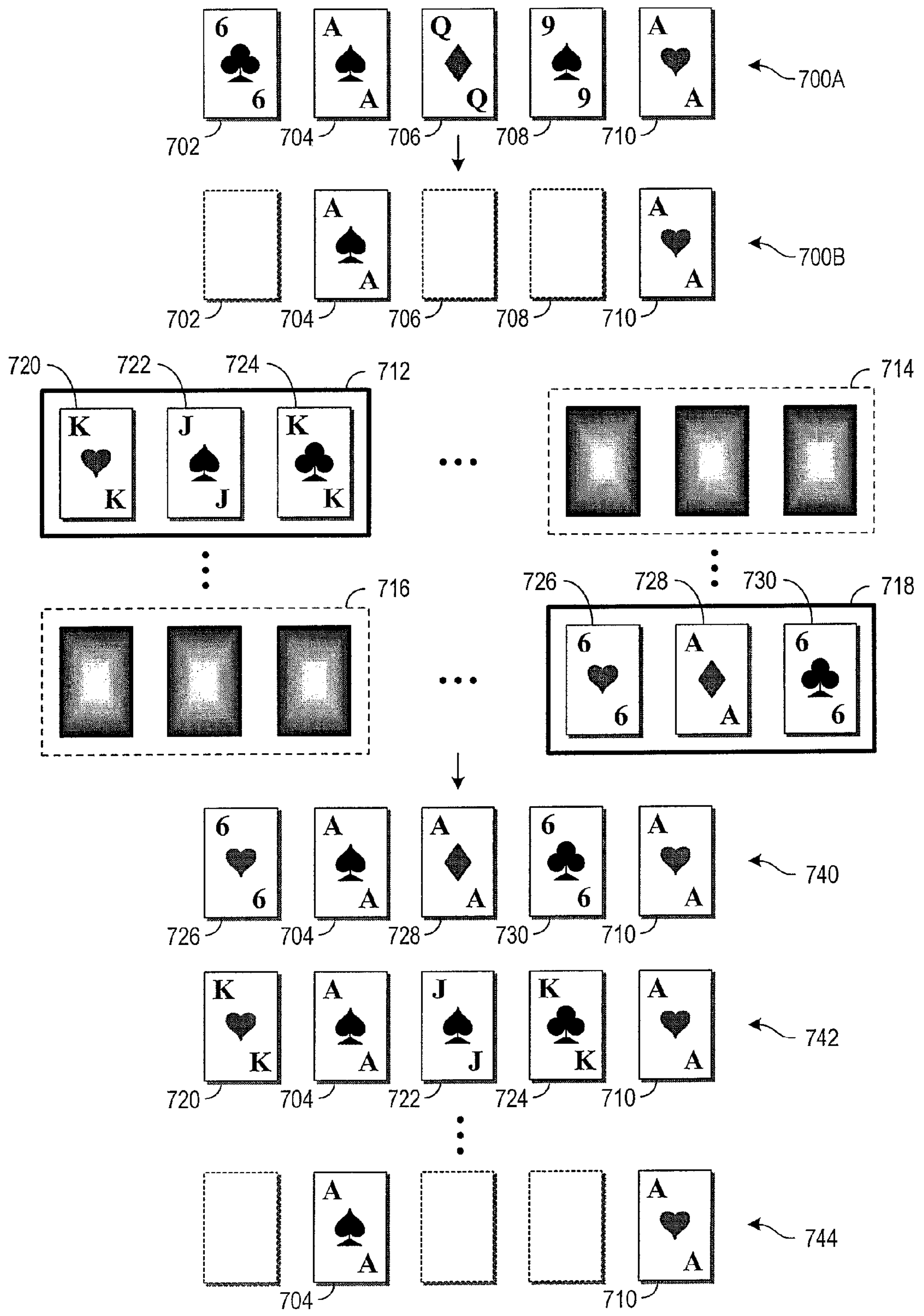
FIG. 7 illustrates a representative embodiment of the present invention where a player is provided with a starting hand(s) and is allowed to select multiple replacement hands from the plurality of selectable replacement hands.

FIG. 7 illustrates a representative example of one embodiment of the present invention, where the player is provided with at least one starting hand and is allowed to select multiple replacement hands from the plurality of selectable replacement hands. A starting hand 700A is dealt to the player. As previously indicated, the starting hand cards may be physically presented/dealt to the player, or alternatively the starting hand may be presented/dealt in an electronic embodiment by electronically presenting the starting hand to the player. In the illustrated embodiment, the starting hand 700A includes five cards 702, 704, 706, 708, 710, although other numbers of cards may be used for the starting hand. Starting hand 700B represents the same starting hand 700A, but at a later stage of activity, showing that the player has opted to hold cards 704 (A-spades) and 710 (A-hearts), and to discard cards 702, 706 and 708.

Assuming five-card resulting hands, three replacement cards will be used in the illustrated embodiment. In accordance with the present invention, a plurality of replacement hands are provided to allow the player to select which of the available replacement hands to use in establishing the player’s resulting hand. In the illustrated embodiment, four replacement hands 712, 714, 716, 718 are presented to the user, although a different number may be used. Each of the replacement hands 712, 714, 716, 718 includes three cards in this embodiment, as the player needs three cards to complete the five-card resulting hands.

Each of the cards associated with each of the replacement hands 712, 714, 716, 718 are originally dealt face down in the illustrated embodiment, although in other embodiments one or more of the cards in various replacement hands may be presented face up. FIG. 7 shows that the player has selected two replacement hands 712, 718. After selection, the cards 720, 722, 724 of selected replacement hand 712, and cards 726, 728, 730 of selected replacement hand 718 are turned face up to expose the respective cards. Using the selected replacement hands 712, 718, the resulting hands 740, 742, . . . 744 can be created. In the illustrated embodiment, each of the held cards 704, 710 are used in each of the multiple resulting hands. The resulting hands 740, 742, . . . 744 include the held cards 704, 710, as well as the cards from the selected replacement hands 712, 718. In the illustrated embodiment, the player’s resulting hand 740 is a full house, with Aces (704, 710, 728) and Sixes (726, 730). The player’s resulting hand 742 includes two pair, with Aces (704, 710) and Kings (720, 724). Other resulting hands 744 may be provided where more resulting hands 712, 714, 716, 718 are selected, and/or where one or more resulting hands may be used more than once in the resulting hands. In one embodiment, the cards of the non-selected replacement hands 714, 716 may optionally be exposed after the player has completed selecting the desired replacement hands. This may show to the player what the player’s resulting hands would have been had the player selected other replacement hands.

In an alternative embodiment, a plurality of starting hands may be provided, where the player is allowed to hold cards in each of the plurality of starting hands. For example, the player may be presented with three starting hands. In such an embodiment, the player is allowed to select multiple replacement hands (e.g., three), where the selected replacement hands are used to create resulting hands with each of the different starting hands. In one embodiment, the player is allowed to identify which of the selected replacement hands is to be associated with each of the starting hands. In another embodiment, each of the selected replacement hands may be automatically associated with the starting hand providing the highest poker rank. In yet another embodiment, each of the selected replacement hands may be associated with each of the starting hands, such that each starting hand/resulting hand combination is used in the creation of a corresponding resulting hand. Other methods may also be used, such as associating the player’s first selected replacement hand with the first resulting hand, associating the player’s second selected replacement hand with the second resulting hand, etc.

Figure 8A:
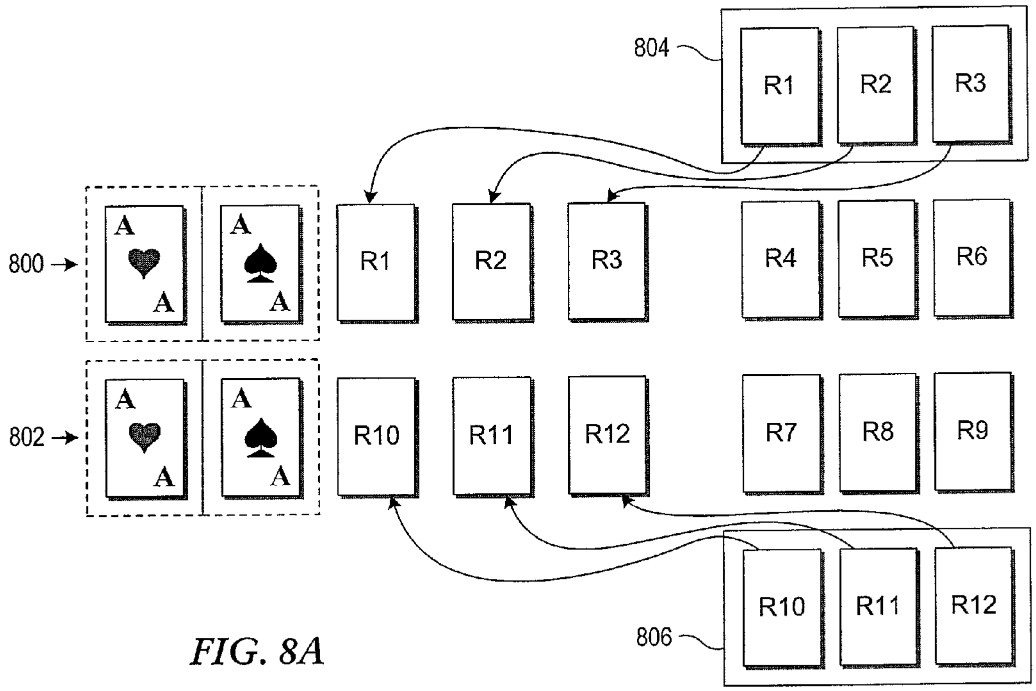
FIGS. 8A and 8B illustrate representative embodiments for presenting resulting hands based on a plurality of selected replacement hands.
Figure 8B:
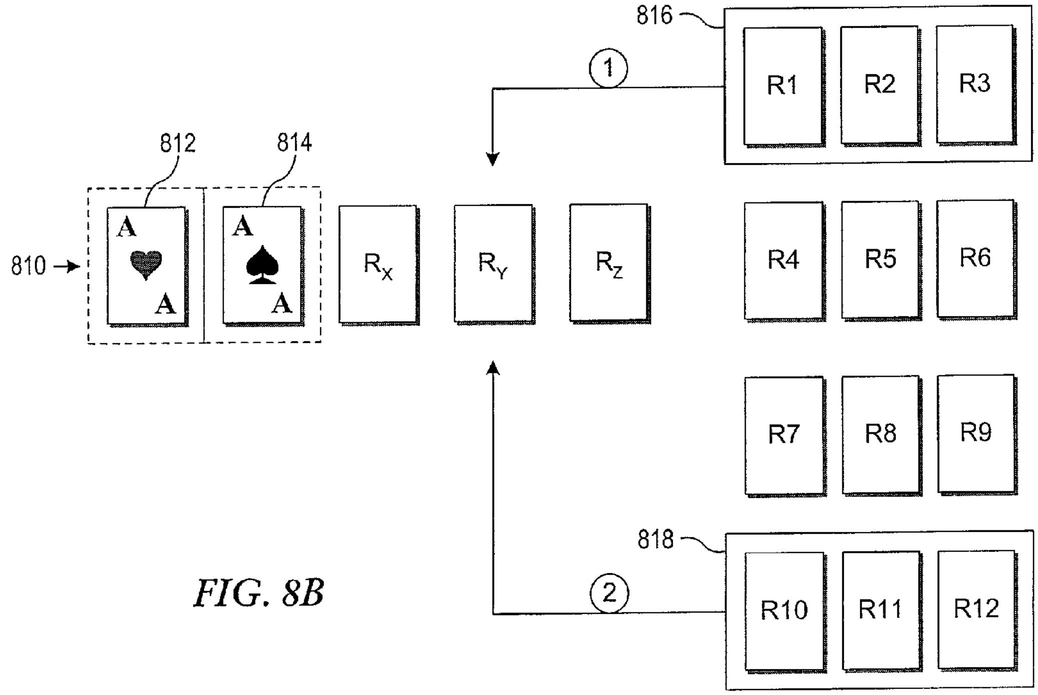

In embodiments where a single starting hand is provided, but multiple resulting hands are created due to the selection of multiple replacement hands, the resulting hands may be calculated and presented in any manner. FIGS. 8A and 8B illustrate representative embodiments for presenting resulting hands based on a plurality of selected replacement hands. FIG. 8A shows that separate resulting hands 800, 802 may be concurrently presented to the player after selection of the desired replacement hands 804, 806. In another embodiment shown in FIG. 8B, each resulting hand may be shown in succession. For example, a first resulting hand 810 may be created using the held cards 812, 814, and the cards of each selected replacement hand 816, 818 successively presented in connection with the held cards of the starting hand. More particularly, a first resulting hand 810 may include the held cards 812, 814 in connection with the replacement cards R1, R2, R3 of the first selected replacement hand 816. Subsequently, a second resulting hand 810 may include the held cards 812, 814 in connection with the replacement cards R10, R11, R12 of the second selected replacement hand 818.

Figure 9A:
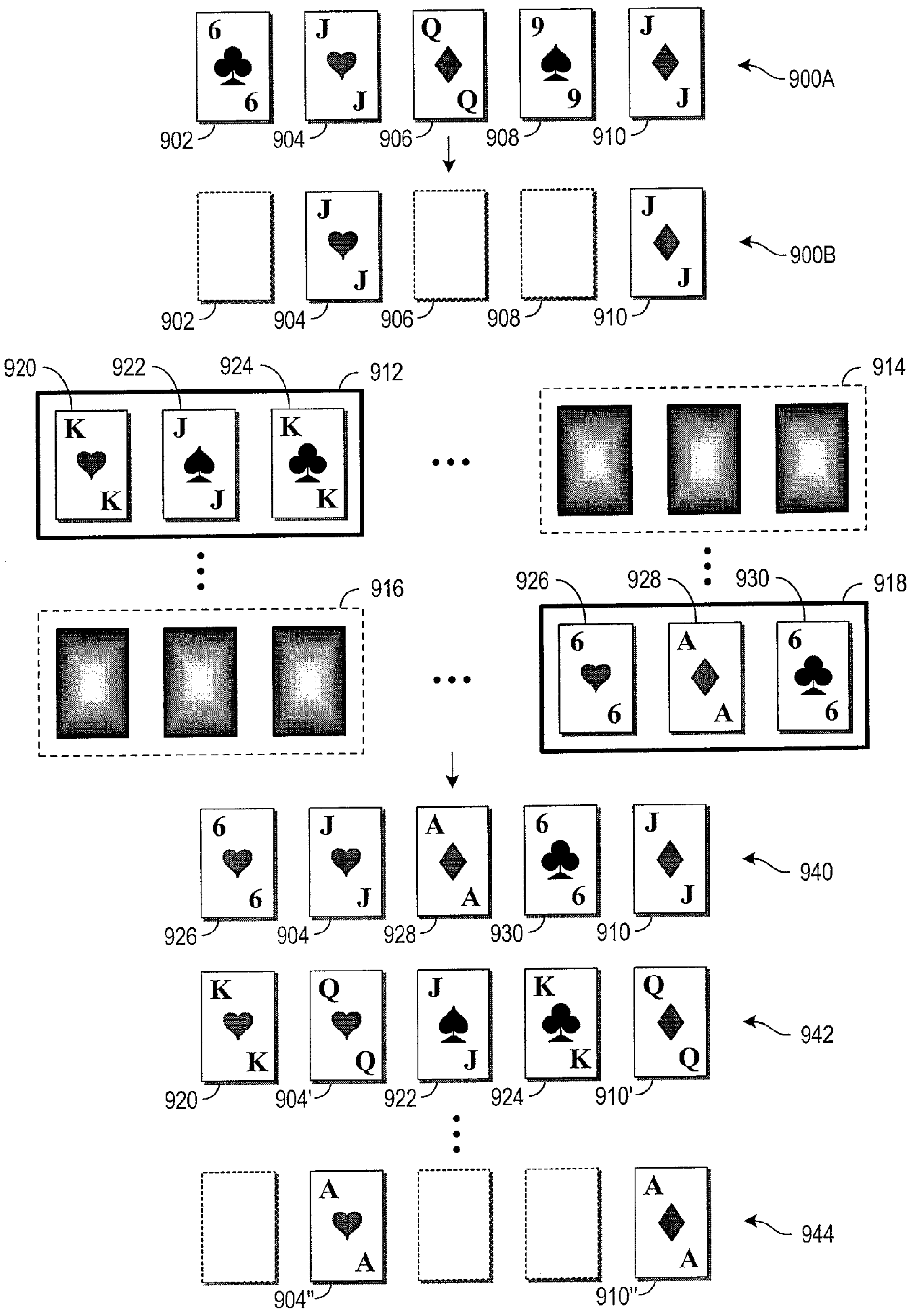
FIG. 9A illustrates a representative example of one embodiment of the present invention where cards similar in poker rank to the held cards are used in one or more of a plurality of resulting hands.

In yet another embodiment previously described, cards that are determined in advance to be similar to the held cards or to have some predetermined relationship to the held cards may be used in each of the resulting hands. FIG. 9A illustrates a representative example of one embodiment of the present invention, where cards similar in poker rank to the held cards are used in one or more of a plurality of resulting hands. A starting hand 900A is dealt to the player. In the illustrated embodiment, the starting hand 900A includes five cards 902, 904, 906, 908, 910, although other numbers of cards may be used for the starting hand. Starting hand 900B represents the same starting hand 900A, but at a later stage of activity, showing that the player has opted to hold cards 904 (J-hearts) and 910 (J-diamonds), and to discard cards 902, 906 and 908.

Assuming five-card resulting hands, three replacement cards will be used in the illustrated embodiment. In accordance with the present invention, a plurality of replacement hands are provided to allow the player to select which of the available replacement hands to use in establishing the player’s resulting hand. In the illustrated embodiment, four replacement hands 912, 914, 916, 918 are presented to the user, although a different number may be used. Each of the replacement hands 912, 914, 916, 918 includes three cards in this embodiment, as the player will use three cards to complete the five-card resulting hands.

Each of the cards associated with each of the replacement hands 912, 914, 916, 918 are originally dealt face down in the illustrated embodiment, although in other embodiments one or more of the cards in various replacement hands may be presented face up. FIG. 9A shows that the player has selected two replacement hands 912, 918. After selection, the cards 920, 922, 924 of selected replacement hand 912, and cards 926, 928, 930 of selected replacement hand 918 are turned face up to expose the respective cards. Using the selected replacement hands 912, 918, the resulting hands 940, 942, . . . 944 can be created. In the illustrated embodiment, the held cards 904, 910 are used in a first replacement hand 940, together with the replacement cards 926, 928, 930 from selected replacement hand 918.

However, in the illustrated embodiment, the held cards 904, 910 are not used in one or more of the other replacement hands 942, 944. In this embodiment, cards having a predetermined relationship or similarity to the held cards 904, 910 are used in other replacement hands 942, 944. For example, the held cards 904, 910 include a J-hearts and J-diamonds respectively. In one embodiment, cards having "similar" poker rank are determined to be other pairs of cards, such as a pair of Queens, Kings, Aces, etc. Thus, the "held" cards in replacement hand 942 include a Q-hearts 904' and Q-diamonds 910'. The cards 920, 922, 924 are then used with this pair of Queens to create resulting hand 942. Similarly, other resulting hands 944 may include still further variations of the held cards 904, 910, such as the pair of Aces (A-hearts 904" and A-diamonds 910").

Figure 9B:
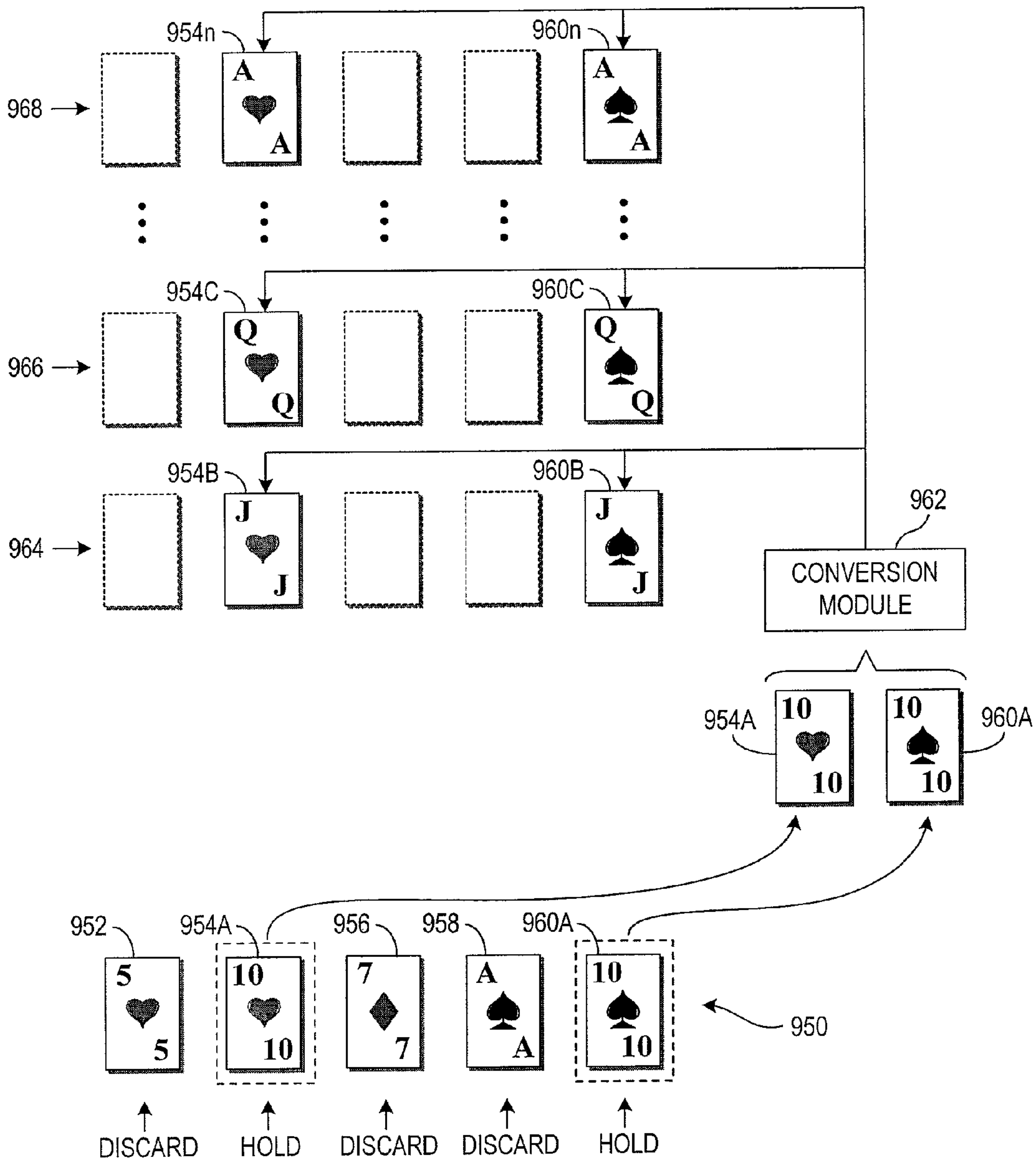
FIGS. 9B and 9C illustrate additional examples of providing resulting hands using cards having a predetermined relationship or similarity to the held cards from another hand.
Figure 9C:
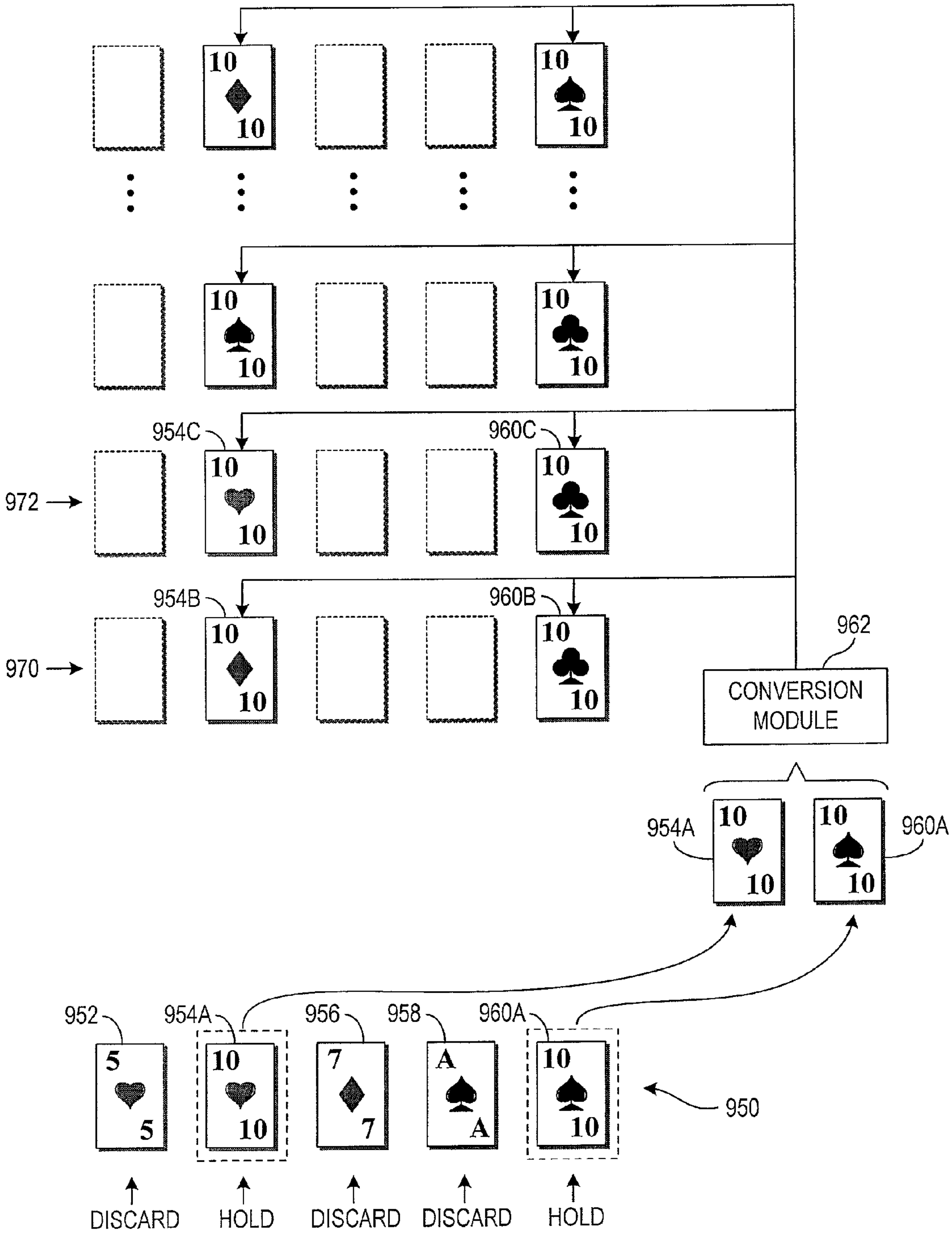

FIGS. 9B and 9C illustrate additional examples of providing resulting hands using cards having a predetermined relationship or similarity to the held cards from another hand. For example, FIG. 9B illustrates a five-card starting hand 950, which includes cards 952, 954A, 956, 958 and 960A. The cards of the starting hand may alternatively be symbols in another gaming activity, such as on a slot machine having a plurality of reels or display segments, such as five reels or display segments in the illustrated embodiment. In the example of FIG. 9B, the player has selected cards 954A and 960A to hold, and the non-held cards 952, 956, 958 are discarded or otherwise ignored.

In accordance with an electronic embodiment of the invention, the held cards 954A, 960A are subjected to a conversion module 962. Such a conversion module 962 may be implemented using electronics, such as a software-based processor(s). The conversion module may use look-up tables, algorithms, pattern generators, or other manners for converting the held cards 954A, 960A to other cards that are not identical. In the illustrated embodiment, the conversion module 962 increments the face-value of the cards 954A, 960A for each of the resulting hands 964, 966, . . . 968 that are being played. For example, for hand 964 the held cards 954A, 960A are converted from a 10-Hearts and 10-Spades to the J-Hearts 954B and J-Spades 960B respectively. Similarly, for hand 966 the held cards 954A, 960A are converted from a 10-Hearts and 10-Spades to the Q-Hearts 954C and Q-Spades 960C respectively. In one embodiment, the pattern can roll over when it reaches the highest card, such as rolling over from a pair of Aces to a pair of twos.

FIG. 9C illustrates another representative embodiment, and utilizes like reference number to those of FIG. 9B where appropriate. In the example of FIG. 9C, the player has again selected cards 954A and 960A to hold, and the non-held cards 952, 956, 958 are discarded or otherwise ignored. The held cards 954A, 960A are processed by the conversion module 962 to produce one or more sets of cards similar to the held cards. In the illustrated embodiment, the conversion module 962 retains the face-value of the cards 954A, 960A for each of the resulting hands 964, 966, . . . 968 that are being played, but changes the suit of the cards. For example, for hand 970 the held cards 954A, 960A are converted from a 10-Hearts and 10-Spades to the 10-Diamonds and 10-Clubs respectively. Similarly, for hand 972 the held cards 954A, 960A are converted from a 10-Hearts and 10-Spades to the 10-Hearts 954C and 10-Clubs 960C respectively, and so forth.

Any number of predetermined and/or partially random conversions may be used, and those described in connection with FIGS. 9A, 9B and 9C are described for purposes of illustration only. For example, any predetermined pattern may be used (e.g., add 1, add 2, subtract 1, overlap such that 4,5,6=>5,6,7, etc.). Further, a table may be used to convert specific cards to other specific cards, or may convert specific cards to any one of a predetermined set of cards. In some embodiments, both the face value and suit of the held cards may be changed, while in other embodiments only the face value or the suit is changed. Again, any desired conversion may be used.

As previously indicated, the number of replacement hands to be selected by the player may be determined in advance, may be random, may be dependent on the player's wager amount and/or bet allocations, etc. Thus, the player is allowed to continue to select replacement hands from the plurality of selectable replacement hands until some predetermined condition arises. In the examples above, the predetermined conditions include a fixed number of selections, a random number of selections, a wager amount and/or wager allocation, etc. Other conditions may similarly be used in connection with the present invention.

Figure 10:
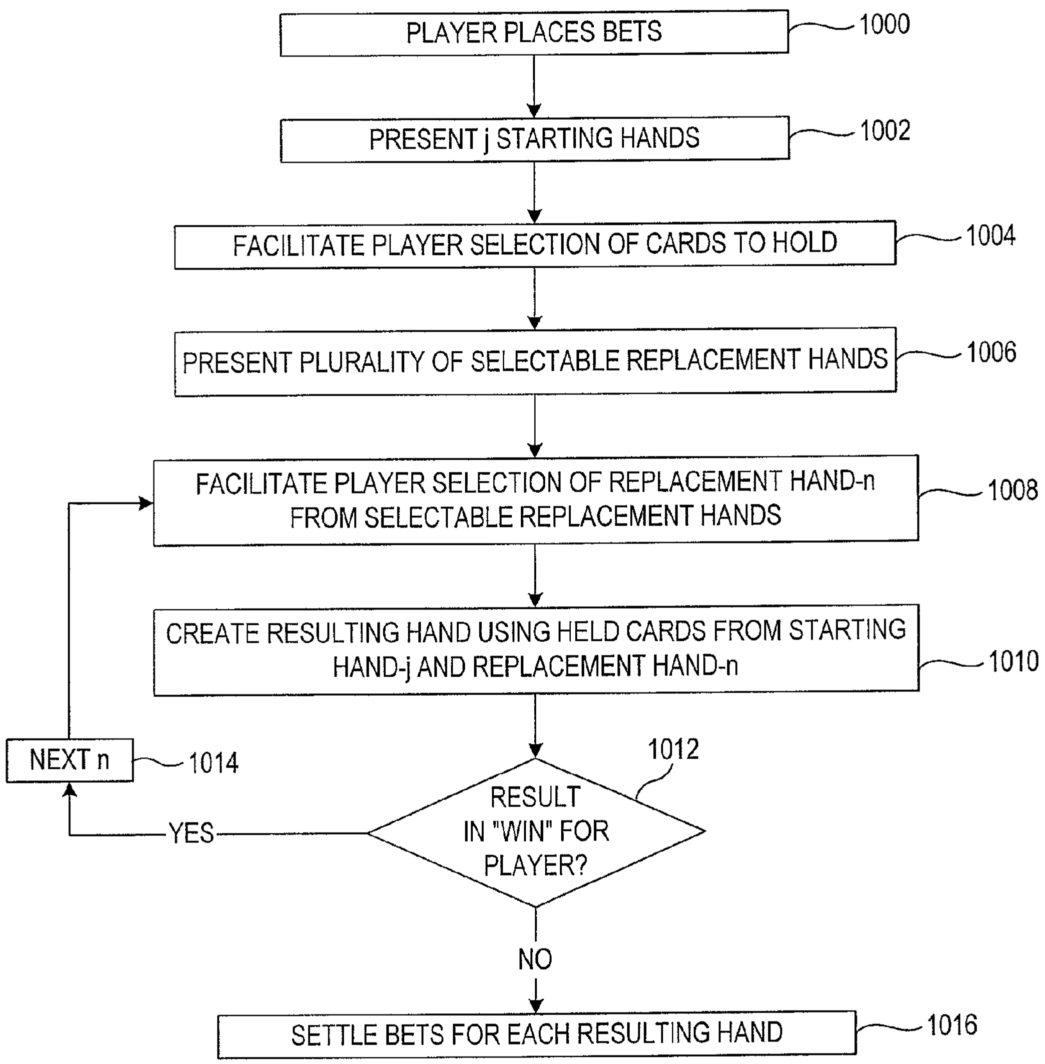
FIG. 10 is a flow diagram illustrating an embodiment involving the selection of replacement hands from the plurality of replacement hands until the corresponding resulting hand does not result in a winning poker hand for the player.

One such other predetermined condition includes selecting replacement hands from the plurality of replacement hands until the corresponding resulting hand does not result in a winning poker hand for the player ("pick until lose"), or until some other termination event occurs. FIG. 10 is a flow diagram illustrating one such "pick until lose" embodiment. In the illustrated embodiment, the player places bets as shown at block 1000. In one embodiment, the player may place some additional wager over a standard wager to be granted the opportunity to participate in the "pick until lose" feature, while other embodiments may include this feature in the standard wager. The player is presented 1002 with a number of starting hands "j". The player is allowed to select cards to hold in the one or more starting hands, as shown at block 1004. A plurality of selectable replacement hands is presented 1006 to the player.

At this point, the player is allowed to select a first replacement hand, hand-n, from the plurality of selectable replacement hands as shown at block 1008. A resulting hand is created 1010 using the held cards from the starting hand-j and the replacement hand-n. If the resulting hand results in a winning hand for the player as determined at decision block 1012, the player can continue selecting replacement hands. This is depicted at block 1014, where the next "n" is used to allow the player to select another replacement hand-n from the selectable replacement hands at block 1008. Again a resulting hand is created 1010 using the held cards from the starting hand-j (which may be the same starting hand, or a different starting hand j=j+1) and the new replacement hand-n. "Using" the held cards may involve using the actual held cards, using cards similar to the held cards, or otherwise using the held cards as the basis for providing such cards in other resulting hands.

In one embodiment, the process continues until it is determined at decision block 1012 that the player's resulting hand did not result in a winning hand. A "winning hand" may be defined in any desired manner, such as a resulting hand that results in a payment based on a pay table, or a resulting hand that corresponds to a predetermined poker rank (whether above or below the predetermined poker rank), etc. In other embodiment, picking may continue until an event occurs, such as picking a replacement hand that includes a stop symbol or other indicia, sound, or the like that indicates that further replacement hand selections are disallowed. The bets are settled 1016 for each resulting hand. Settling of the bets may be made after each resulting hand is created, or after all of the resulting hands have been determined.

It should be noted that in an embodiment such as that described in connection with FIG. 10, many variations may be provided in accordance with the invention. For example, rather than selecting replacement hands, the player may select from a plurality of other selectable items, such as "continue" symbols and "stop" symbols. If the player picks a continue symbol, a new replacement hand is provided to the player, and selection of a stop symbol terminates the hand. In another embodiment, the selectable items may be replacement hands, but may be marked to indicate whether or not the player will be allowed to make further selections. For example, one or more cards associated with a selected replacement hand may have a stop sign or other stop symbol(s) associated therewith, thus indicating that no further replacement hand selections will be allowed. Alternatively, one or more cards associated with a selected replacement hand may have a "go" indicator or other continue symbol(s) associated therewith, thus indicating that the player is allowed to select one or more replacement hands. In another embodiment, the stop symbols may include a value, such as a credit value, multiplier value, etc. Thus, when the player selects a replacement hand, if a multiplier value (e.g., 1×, 2×, etc.) is associated with the selected replacement hand, the continued replacement hand selections end, although the player will be awarded the multiplier amount. In another embodiment, a separate reference may be used to determine whether the player is allowed to continue selecting replacement hands. For example, a random or fixed value, such as a playing card value, may be presented to the player. More particularly, such a fixed value may be a playing card of Eight of any suit. The player may be allowed to select one of a plurality of selectable playing cards, and if the selected item beats the Eight, the player is allowed to continue selecting replacement hands.

Figure 11A:
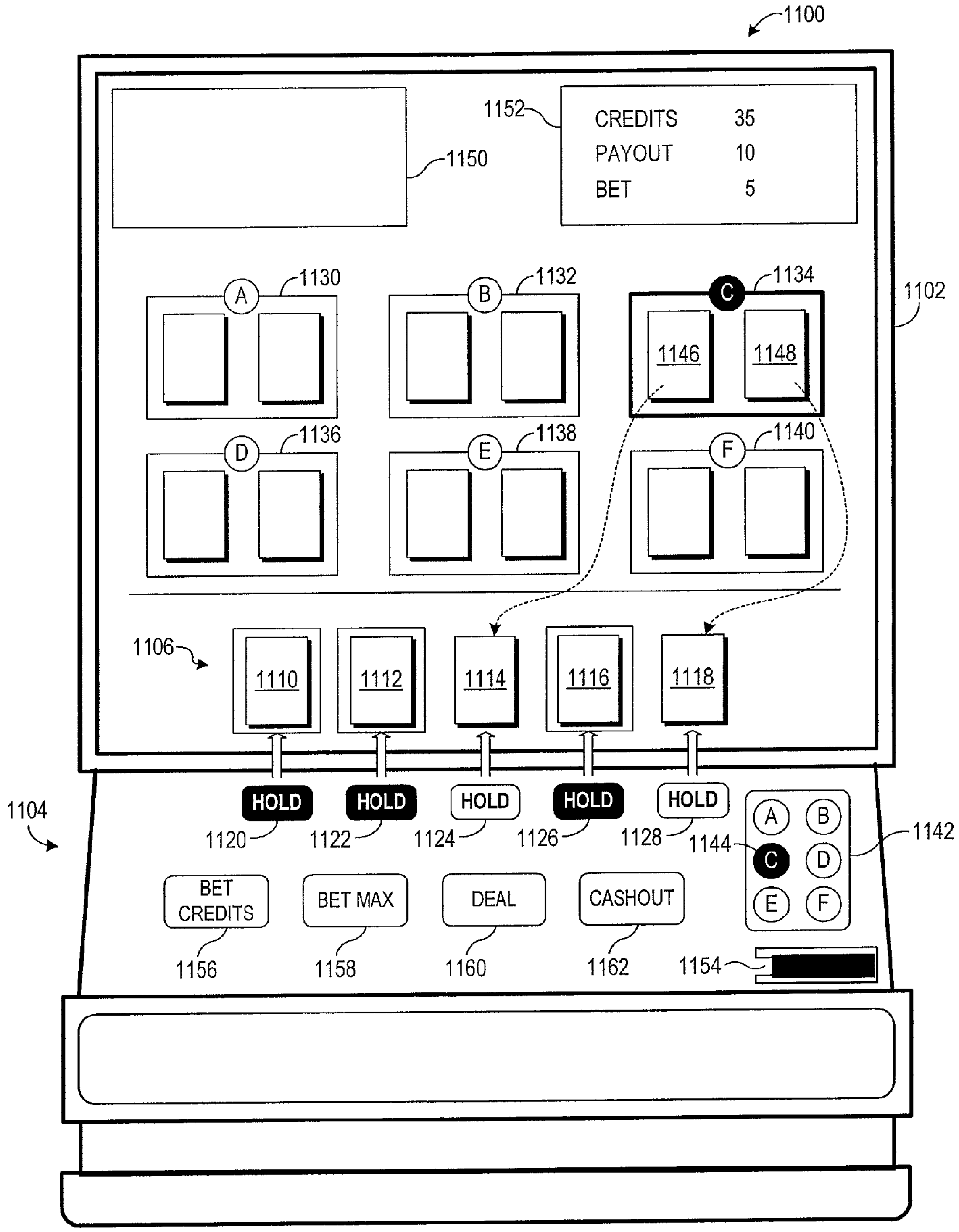
FIG. 11A illustrates a representative embodiment of a casino-style gaming device in which the principles of the present invention may be applied.

The present invention may be implemented in different manners, such as via a live table game or an electronic embodiment. FIG. 11A illustrates a representative embodiment of a casino-style gaming device in which the principles of the present invention may be applied. For purposes of explanation, the description of the gaming device is FIG. 11A is provided in terms of a gaming device in the form of a kiosk or slot machine 1100. However, the present invention is analogously applicable to other computer-based systems.

The illustrated gaming machine 1100 includes a computing system (not shown) to carry out operations according to the invention. The illustrated gaming machine 1100 includes a display 1102, and a user interface 1104, although some or all of the user interface may be provided via the display 1102 in touch screen embodiments. The user interface 1104 allows the user to control and engage in play of the gaming machine 1100. The particular user interface mechanisms associated with user interface 1104 is dependent on the type of gaming machine. For example, the user interface 1104 may include one or more buttons, switches, joysticks, levers, pull-down handles, trackballs, voice-activated input, or any other user input system or mechanism that allows the user to play the particular gaming activity. The user interface 1104 may allow the user to enter coins, bills, or otherwise obtain credits through vouchers, tokens, credit cards, tickets, etc. Various mechanisms for entering such vouchers, tokens, credit cards, coins, tickets, etc. are known in the art. For example, coin/token input mechanisms, card readers, credit card readers, smart card readers, punch card readers, and other mechanisms may be used to enter wagers. It is through the user interface 1104 that the user can initiate and engage in a gaming activity in accordance with the invention. While the illustrated embodiment depicts various buttons for the user interface 1104, it should be recognized that a wide variety of user interface options are available for use in connection with the present invention, including pressing buttons, touching a segment of a touch-screen, entering text, entering voice commands, or other known user entry methodology. The particular user interface mechanism utilized is not relevant to the present invention.

The display device 1102 may include one or more of an electronic display, a mechanical display, and fixed display information such as information permanently associated with a glass/plastic panel on the gaming machine 1100. The cards or other indicia associated with the play of the game may be presented on an electronic display device.

In the embodiment illustrated in FIG. 11A, the player receives a starting hand 1106 including five cards 1110, 1112, 1114, 1116, 1118. The user interface 1104 provides some manner to allow the player to hold cards if desired, such as the "hold" buttons 1120, 1122, 1124, 1126, and 1128. As depicted by the highlighted hold buttons 1120, 1122, 1126, the player has chosen to hold cards 1110, 1112, and 1116. Upon holding such cards, the non-held (i.e., discarded) cards 1114, 1118 may optionally be turned face down, made transparent, removed, or otherwise distinguished from the held cards.

The player is presented with a plurality of possible replacement hands 1130, 1132, 1134, 1136, 1138, 1140. Six possible replacement hands are depicted in the illustrated embodiment, although the number could be any plurality such as two, three, ten, a hundred, etc. In the illustrated embodiment, each replacement hand includes two cards, since the player discarded two cards and two cards will provide a proper replacement for a five-card resulting hand.

The selectable replacement hands 1130, 1132, 1134, 1136, 1138, 1140 may be provided with some indicia to allow the player to identify and select the desired replacement hand(s). For example, the letters A, B, C, D, E, and F are respectively associated with the selectable replacement hands 1130, 1132, 1134, 1136, 1138, 1140. In this manner, the player can identify the selected replacement hand(s) via the user interface 1104, such as via the replacement hand selection buttons 1142. Other manners of selecting the desired replacement hand(s) may also be employed, such as where the display device includes touch screen technology, thus enabling the player to touch a location on the touch screen display corresponding to the replacement hand(s) to be selected.

In the illustrated embodiment, the player has selected replacement hand 1134 by touching replacement hand 1134 on the screen, selecting the button "C" 1144 on the replacement hand selection buttons 1142, or otherwise. The selected replacement hand 1134 includes two face-down cards, 1146, 1148. When the user has made the selection, the cards 1146, 1148 are used to complete the hand 1106, by replacing the original cards 1114, 1118 with replacement cards 1146, 1148.

The resulting hand is therefore created, and can be compared to a pay table to determine if the resulting hand is a winning hand for the player. The gaming machine may include an area 1150 to present the pay table used in such a comparison. A display segment or panel 1152 may also be provided to display information such as the value of the current bet, for example 5 credits (where credits may represent, for example, nickels, dimes, quarters, dollars, etc.), the number of accumulated credits, the number of credits paid out on a particular play, etc.

A wager acceptor 1154 is operative to receive wager tokens, coins, bills, credit/debit cards, coupons, smart cards, prepaid casino cards, electronic fund transfer (EFT), tickets, and the like. Various other user interface items, such as control buttons 1156, 1158, 1160, 1162 may be provided to allow the player to make control inputs during play of the game. For example, the player may enter credits to wager by pressing the BET CREDITS button 1156 one or more times to place a wager that may be displayed via the display/panel 1152. Alternatively, the player may place a maximum bet by pressing the BET MAX button 1158. A DEAL button 1160 or other similar user interface item may be provided to allow the player to signal when the player has completed the selection of cards to hold. In one embodiment, pressing such a button 1160 triggers the presentation of the plurality of replacement hands 1130, 1132, 1134, 1136, 1138, 1140. Other buttons such as the CASH OUT button 1162 may be provided to allow the player to cash out any accumulated credit balance. Still other user interface items may be provided, and the user interface items described in connection with FIG. 11A are intended to be representative, and not limiting, of the types of user interface items that may be provided.

Figure 11B:
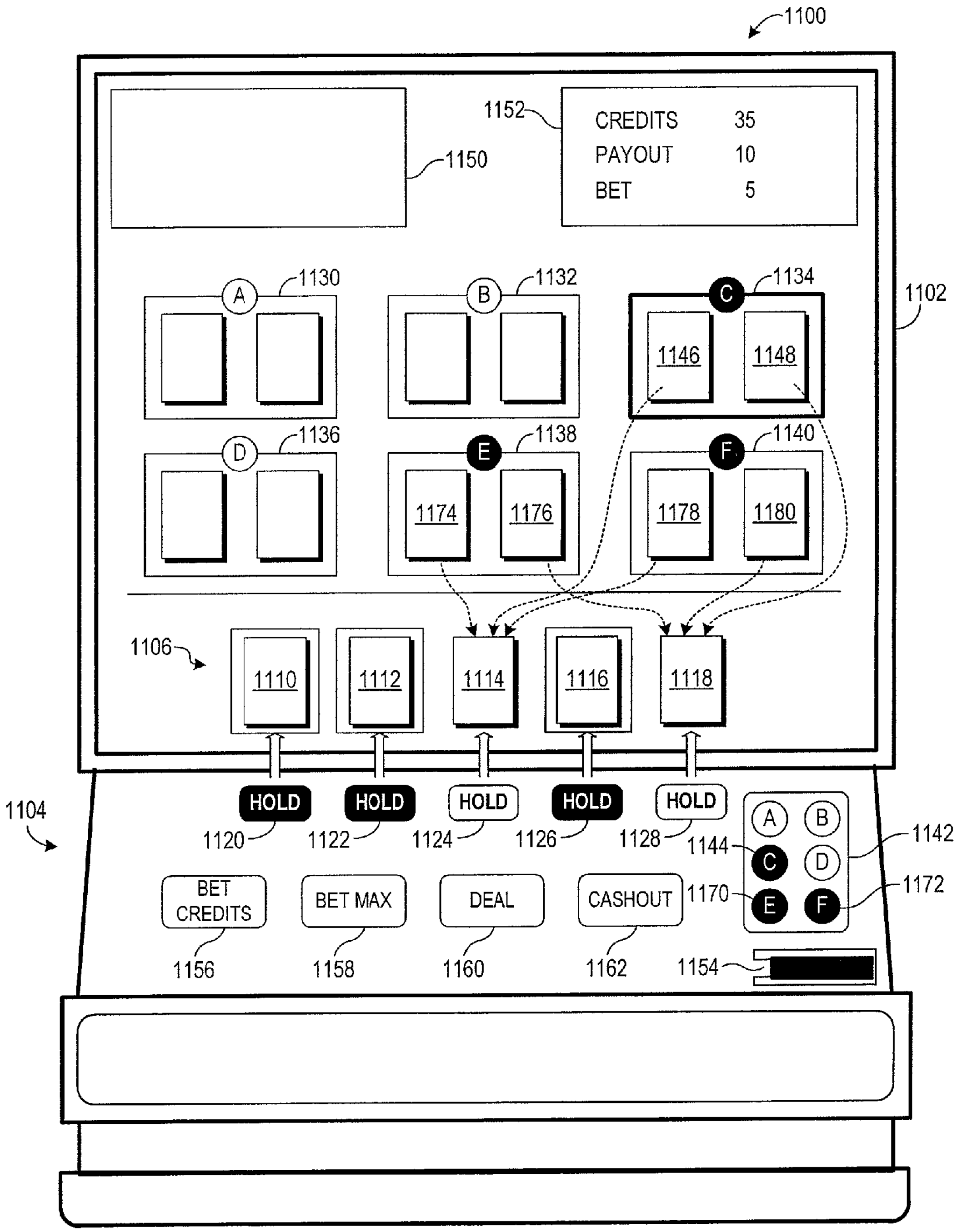
FIG. 11B illustrates a representative example of a multiple hand version of a gaming machine in accordance with the present invention, where a single starting hand is provided.

As may now be readily understood, the device 1100 may be programmed to play various embodiments of the invention. Alternatively, the device may include a control input to allow a player to select play of different variations of the game. For example, one variation is a multiple hand variation as previously described. FIG. 11B illustrates a representative example of a multiple hand version of a gaming machine in accordance with the present invention, where a single starting hand is provided. The representative gaming machine of FIG. 11B includes similar features as those described in connection with FIG. 11A. Therefore, FIG. 11B uses references numbers corresponding to those described in FIG. 11A where applicable. The embodiment of FIG. 11B is similar to that of FIG. 11A, except that multiple resulting hands are provided.

As shown in FIG. 11B, the player has held cards 1110, 1112, 1116, and has used the selection buttons 1142 to select multiple replacement hands for use with the starting hand 1106 to create a plurality of resulting hands. In the illustrated embodiment, the player has selected replacement hands 1134, 1138, and 1140 by touching the corresponding replacement hands on the screen, by selecting the buttons "C" 1144, "E" 1170, and "F" 1172 on the replacement hand selection buttons 1142, and/or through other user input mechanisms. The selected replacement hands 1134, 1138, 1140 each include two face-down cards in the illustrated embodiment. Selected replacement hand 1134 includes cards 1146, 1148, selected replacement hand 1138 includes cards 1174, 1176, and selected replacement hand 1140 includes cards 1178, 1180. When the user has made the selections, the cards in each of the selected replacement hands 1134, 1138, 1140 are used to create three resulting hands, by replacing the original cards 1114, 1118 with the cards of each of the selected replacement hands.

Figure 12A:
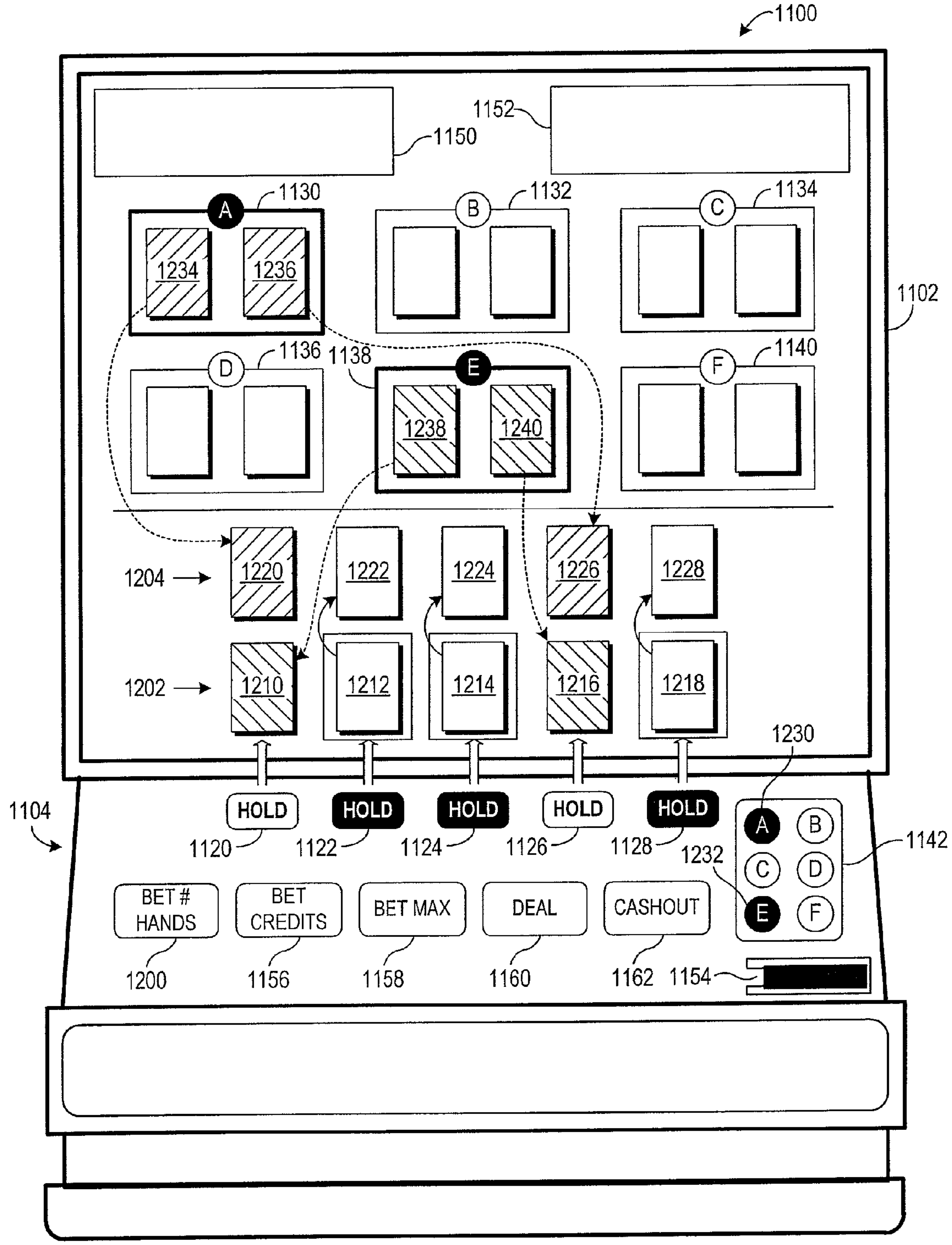
FIG. 12A illustrates a representative example of another multiple hand version of a gaming machine in accordance with the present invention, where multiple starting hands are provided and cards held in one starting hand are duplicated/converted for use as the held cards in other starting hands.

FIG. 12A illustrates a representative example of another multiple hand version of a gaming machine in accordance with the present invention, where multiple starting hands are provided and cards held in one starting hand are duplicated/converted for use as the held cards in other starting hands. The representative gaming machine of FIG. 12A includes similar features as those described in connection with FIGS. 11A and 11B. Therefore, FIG. 12A uses references numbers corresponding to those described in FIGS. 11A/B where applicable. The embodiment of FIG. 12A is similar to that of FIG. 11B, except that multiple starting hands are provided. In the embodiment of FIG. 12A, multiple resulting hands are provided as a result of a plurality of starting hands being presented and/or multiple replacement hands being selected by the player. In the illustrated embodiment, multiple starting hands are provided, and the player is allowed to select multiple replacement hands.

More particularly, the player may choose to play multiple hands, by indicating so via the user interface 1104. For example, the player may use the BET# HANDS button 1200 to indicate the number of hands to be played. In one embodiment, the player wagers additional credits or other player assets to be afforded the opportunity to play multiple hands. For purposes of description, it is assumed that the player chose to participate in two poker hands, which presents the user with two hands 1202, 1204 in the illustrated embodiment. Hand 1202 includes five cards 1210, 1212, 1214, 1216, 1218, and hand 1204 includes five cards 1220, 1222, 1224, 1226, 1228.

The user interface 1104 provides some manner to allow the player to hold cards if desired, such as the "hold" buttons 1120, 1122, 1124, 1126, and 1128. In the illustrated embodiment, it is assumed that such hold buttons are provided for a first hand 1202, and the held cards are also used in other hands such as hand 1204. Alternatively, the user may be allowed to hold cards in any one or more of the hands 1202, 1204, which may be effected via user interface buttons, touch-screen technology, or other user interface mechanisms. As depicted by the highlighted hold buttons 1122, 1124, 1128, the player has chosen to hold cards 1212, 1214, and 1218 from hand 1202. These cards are then duplicated into cards 1222, 1224 and 1228 of hand 1204 in the illustrated embodiment. Upon holding such cards, the non-held (i.e., discarded) cards 1210 and 1216 of hand 1202, and cards 1220 and 1226 of hand 1204 may optionally be turned face down, made transparent, removed, or otherwise distinguished from the held cards.

The player is presented with a plurality of possible replacement hands 1130, 1132, 1134, 1136, 1138, 1140. Six possible replacement hands are depicted in the illustrated embodiment, although the number could be any number. The number of replacement hands presented may be fixed, may be a particular number or percentage higher than the number of hands being played, etc. In the illustrated embodiment, each replacement hand includes two cards, since the player discarded two cards.

As described in connection with FIGS. 11A/B, the selectable replacement hands 1130, 1132, 1134, 1136, 1138, 1140 may be provided with some indicia to allow the player to identify and select the desired replacement hands, such as the letters A, B, C, D, E, and F. Other manners of selecting the desired replacement hands may also be utilized, such as where the display device includes touch screen technology, thus enabling the player to touch a location on the touch screen display corresponding to the replacement hands to be selected.

In the illustrated embodiment, the player has selected replacement hands 1130 and 1138 by touching these replacement hands on the screen, selecting the buttons "A" 1230 and "E" 1232 on the replacement hand selection buttons 1142, or otherwise. The selected replacement hands 1130, 1138 each include two face-down cards. Replacement hand 1130 includes cards 1234 and 1236, and replacement hand 1138 includes cards 1238 and 1240. When the user has made the selection, the cards 1238 and 1240 are used to complete one of the hands 1202, 1204, and is illustrated as completing hand

1202 by replacing the original cards 1210, 1216 with replacement cards 1238, 1240 respectively. The cards 1234 and 1236 of replacement hand 1130 are used to complete hand 1204 by replacing the original cards 1220, 1226 with replacement cards 1234, 1236 respectively. The resulting hands 1202, 1204 are thus created, and can be compared to a pay table to determine if the resulting hands are winning hands for the player.

Figure 12B:
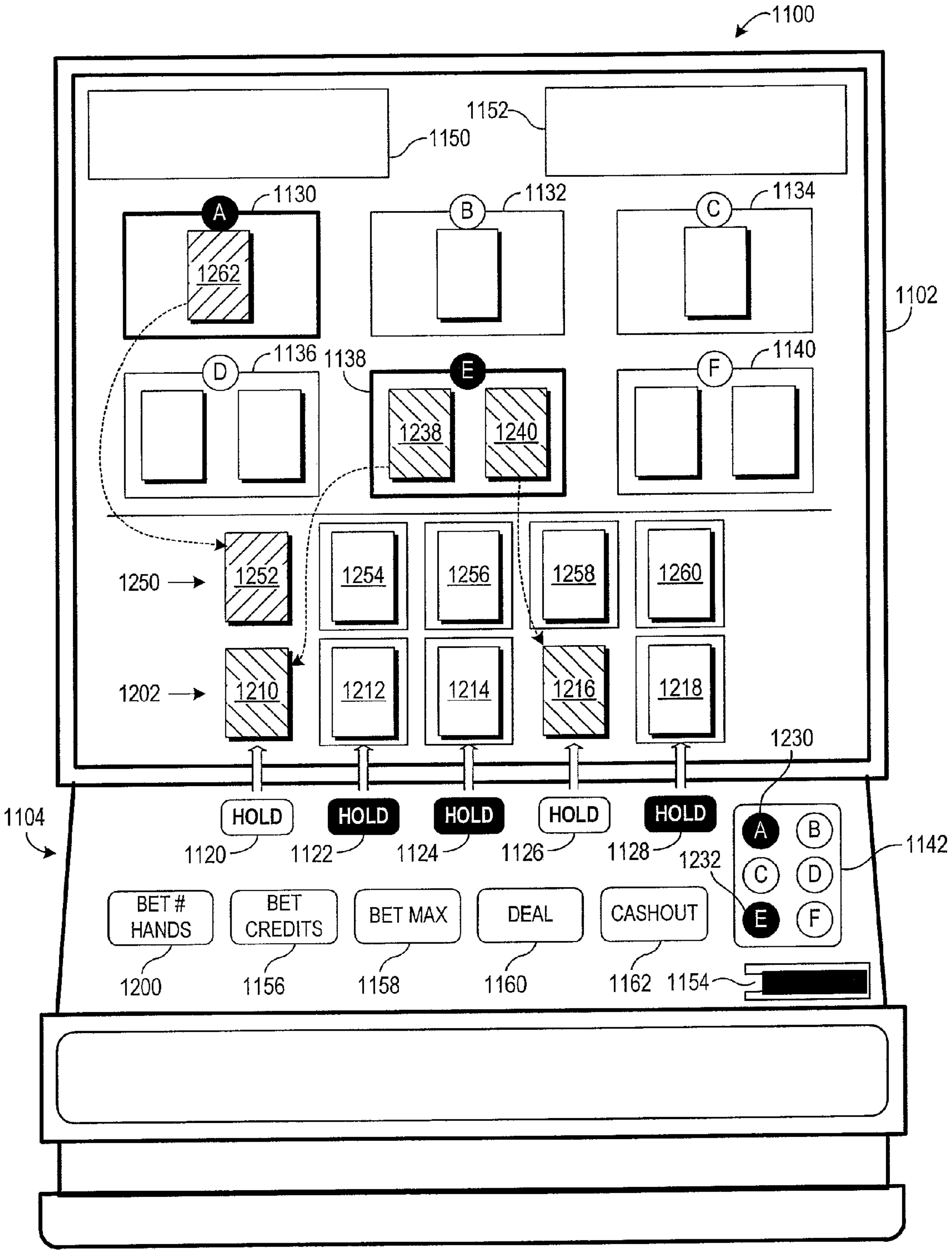
FIG. 12B illustrates a representative example of another multiple hand version of a gaming machine in accordance with the present invention, where multiple starting hands are provided and cards are individually held in each of the multiple starting hands.

FIG. 12B illustrates a representative example of another multiple hand version of a gaming machine in accordance with the present invention, where multiple starting hands are provided and cards are individually held in each of the multiple starting hands. The representative gaming machine of FIG. 12B includes similar features as those described in connection with FIG. 12A. Therefore, FIG. 12B uses references numbers corresponding to those described in FIGS. 11A, 11B, and 12A where applicable. The embodiment of FIG. 12B is similar to that of FIG. 12A, except that the player is allowed to hold cards in each of the starting hands. In the embodiment of FIG. 12B, multiple resulting hands are provided as a result of a plurality of starting hands being presented and/or multiple replacement hands being selected by the player.

More particularly, the player may choose to play multiple hands, by indicating so via the user interface 1104. For example, the player may use the BET# HANDS button 1200 to indicate the number of hands to be played. In one embodiment, the player wagers additional credits or other player assets to be afforded the opportunity to play multiple hands. For purposes of description, it is assumed that the player chose to participate in two poker hands, which presents the user with two hands 1202, 1250 in the illustrated embodiment. Hand 1202 includes five cards 1210, 1212, 1214, 1216, 1218, and hand 1250 includes five cards 1252, 1254, 1256, 1258 and 1260.

The user interface 1104 provides some manner to allow the player to hold cards if desired, such as the "hold" buttons 1120, 1122, 1124, 1126, and 1128. In the illustrated embodiment, user may be allowed to hold cards in each of the hands 1202, 1250, which may be effected via user interface buttons, touch-screen technology, or other user interface mechanisms. For example, the hold buttons 1120, 1122, 1124, 1126, 1128 may first be used for starting hand 1202, and subsequently for starting hand 1250. As depicted by the highlighted hold buttons 1122, 1124, 1128, the player has chosen to hold cards 1212, 1214, and 1218 from hand 1202. While not shown, the hold buttons 1122, 1124, 1126, 1128 (or other UI mechanisms) are used to hold cards 1254, 1256, 1258, and 1260 from starting hand 1250. Upon holding such cards, the non-held (i.e., discarded) cards 1210 and 1216 of hand 1202, and card 1252 of hand 1250 may optionally be turned face down, made transparent, removed, or otherwise distinguished from the held cards.

Because the player may hold a different number of cards in various starting hands, different numbers of replacement cards in replacement hands may be provided. For example, combinations of one, two, three, etc. replacement cards may be provided. In the illustrated embodiment, some of the replacement hands 1130, 1132, 1134 include one replacement card, while other replacement hands 1136, 1138, 1140 include two replacement cards. Thus, the player may be presented with a plurality of replacement hands having the exact number of replacement cards required to complete a particular hand, or the player may select a combination of replacement hands collectively providing a number of cards to complete a particular resulting hand.

More particularly, the player may select replacement hand 1130 by touching this replacement hand on the screen, selecting button "A" 1230 on the replacement hand selection buttons 1142, or otherwise. This selection provides one card 1262 as the replacement card for discarded card 1252, thereby completing hand 1250. The player may also select replacement hand 1138, which provides two cards 1238, 1240 for use in replacing cards 1210, 1216, thereby completing hand 1202. The resulting hands 1202, 1250 are thus created, and can be compared to a pay table to determine if the resulting hands are winning hands for the player. It should be noted that if the player had needed three cards, for example, to complete a hand, the player could have selected a replacement hand 1130, 1132, 1134 providing one of the replacement cards, as well as one of the replacement hands 1136, 1138, 1140 providing the remaining two replacement cards. Alternatively, additional selectable replacement hands could be provided that include three replacement cards. The same holds true where four or more replacement cards are needed, where combinations of replacement cards may be selected by the player, and/or replacement hands having the appropriate number of replacement cards may be provided for selection.

In multiple hand versions of the present invention, the replacement cards may be provided via separate decks of cards, or may be provided via the same deck of cards. Further, one embodiment of the invention involves selecting a number of replacement hands that is always less than the number of available replacement hands from which the selection is made. In another embodiment, the player can select up to all of the available replacement hands. In other embodiments, other payout information can be associated with a selected replacement hand in addition, or in lieu of, replacement cards. For example, the player may select a replacement hand which turns out to be a multiplier, a payout value, etc. In other embodiments, the player can wager the same amount for each different hand played, or may wager the same amount for some hands and different amounts for other hands, or may wager a different amount for every hand being played.

Further, in multiple hand embodiments, the player can wager multiple credits per replacement hand selection and/or multiple credits per hand. For example, the player may wager three credits to obtain three replacement hand selections, and two credits for each hand to provide greater returns on any hand(s) that wins. As a more particular example, a player may want to play one hand, but receive five replacement hand selections at one credit each, resulting in a wager of five credits. By having five replacement hands for the single starting hand, the player will have a better chance of receiving a winning hand or a larger winning hand. If a player were to make a similar play but wager five credits per hand, the player would wager twenty-five credits. In other words, the player would receive five replacement hands for each of the five resulting hands. Each of the five played hands is completed with the best replacement hand of the five replacement hands selected.

In another embodiment, a wager may be placed for each combination of starting hands and selected replacement hands. For example, if one credit per combination is wagered, three starting hands are provided, and three replacement hands may be selected, the player may wager nine credits to be allowed to create nine resulting hand combinations, as each of the three replacement hands can be used with each of the three starting hands. Such an embodiment is particularly beneficial where the player is allowed to hold cards in each of the starting hands, as different resulting hand combinations will result. The player may also wager more than one credit per combination. For example, if five credits were wagered for each of the nine combinations, then the player would wager forty-five credits. Any number of wagering variations may be used in connection with the present invention.

Figure 13:
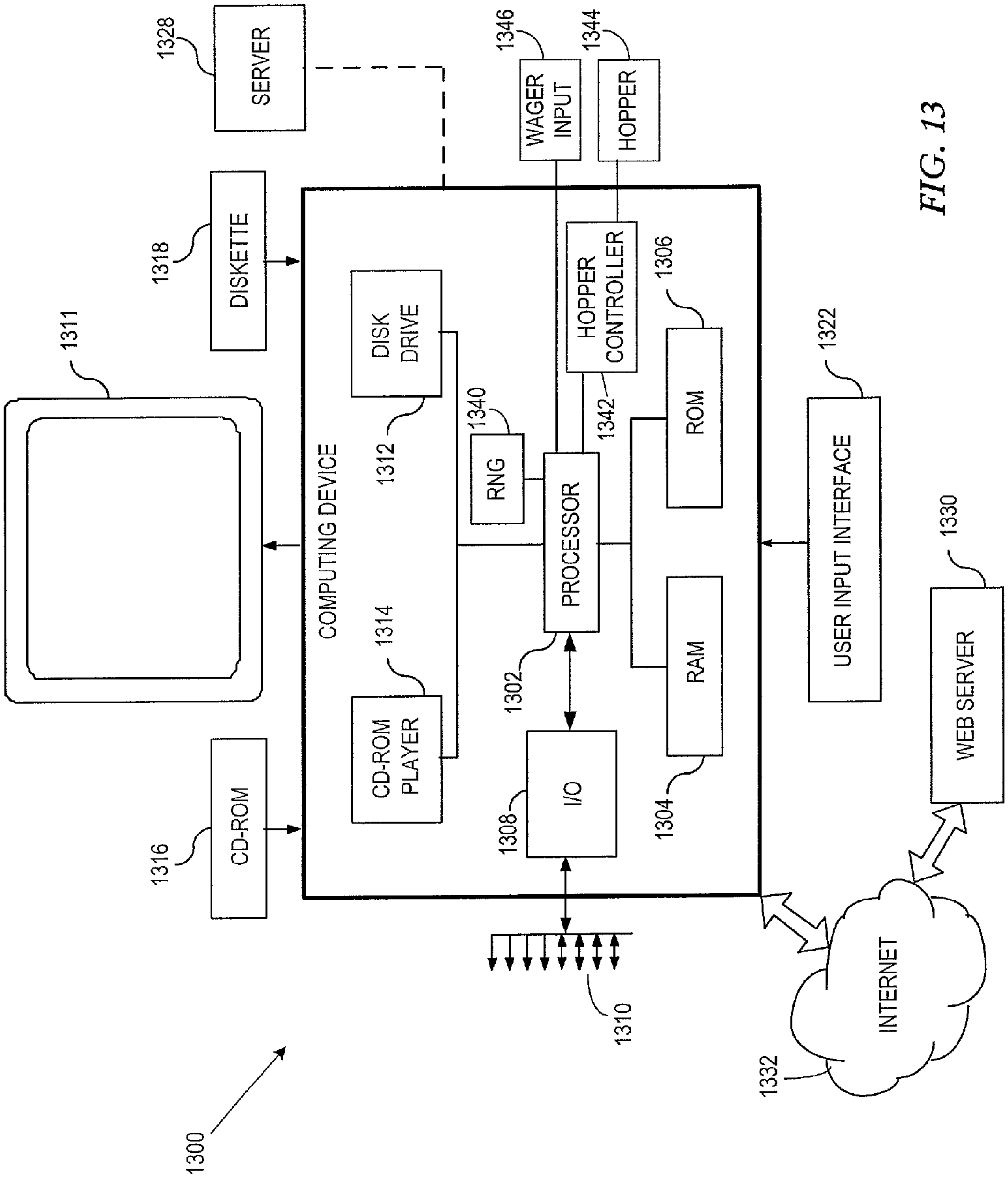
FIG. 13 illustrates a representative computing system capable of carrying out operations in accordance with the invention.

The present invention may be implemented as a casino gaming machine such as slot machines or other special purpose gaming kiosks, video games, or may be computing systems operating under the direction of local gaming software and/or remotely-provided software such as provided by an application service provider (ASP). The casino gaming machines utilize computing systems to control and manage the gaming activity. An example of a representative computing system capable of carrying out operations in accordance with the invention is illustrated in FIG. 13.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 1300 of FIG. 13 is an example computing structure that can be used in connection with such electronic gaming machines, computers, or other computer-implemented devices to carry out operations of the present invention.

The example computing arrangement 1300 suitable for performing the gaming functions in accordance with the present invention typically includes a central processor (CPU) 1302 coupled to random access memory (RAM) 1304 and some variation of read-only memory (ROM) 1306. The ROM 1306 may also represent other types of storage media to store programs, such as programmable ROM (PROM), erasable PROM (EPROM), etc. The processor 1302 may communicate with other internal and external components through input/output (I/O) circuitry 1308 and bussing 1310, to provide control signals, communication signals, and the like.

Chance-based gaming systems such as slot machines, in which the present invention is applicable, are governed by random numbers and processors. A display device 1311 is used to display the gaming activity as facilitated by a random number generator (RNG). RNGs are well-known in the art, and may be implemented using hardware, software operable in connection with the processor 1302, or some combination of hardware and software. The present invention is operable using any known RNG, and may be integrally programmed as part of the processor 1302 operation, or alternatively may be a separate RNG controller 1340.

The computing arrangement 1300 may also include one or more data storage devices, including hard and floppy disk drives 1312, CD-ROM drives 1314, and other hardware capable of reading and/or storing information such as DVD, etc. In one embodiment, software for carrying out the operations in accordance with the present invention may be stored and distributed on a CD-ROM 1316, diskette 1318 or other form of media capable of portably storing information. These storage media may be inserted into, and read by, devices such as the CD-ROM drive 1314, the disk drive 1312, etc. The software may also be transmitted to the computing arrangement 1300 via data signals, such as being downloaded electronically via a network, such as the Internet. Further, as previously described, the software for carrying out the functions associated with the present invention may alternatively be stored in internal memory/storage of the computing device 1300, such as in the ROM 1306.

The computing arrangement 1300 is coupled to the display 1311, which represents a display on which the gaming activities in accordance with the invention are presented. The display 1311 represents the "presentation" of the video information in accordance with the invention, and may be any type of known display or presentation screen, such as LCD displays, plasma display, cathode ray tubes (CRT), etc. Where the computing device 1300 represents a stand-alone or networked computer, the display 1311 may represent a standard computer terminal or display capable of displaying multiple windows, frames, etc. Where the computing device is embedded within an electronic gaming machine (see FIGS. 11, 12), the display 1311 corresponds to the display screen of the gaming machine/kiosk. A user input interface 1322 such as a mouse, keyboard/keypad, microphone, touch pad, trackball, joystick, touch screen, voice-recognition system, etc. may be provided.

The computing arrangement 1300 may be connected to other computing devices or gaming machines, such as via a network. The computing arrangement 1300 may be connected to a network server 1328 in an intranet or local network configuration. The computer may further be part of a larger network configuration as in a global area network (GAN) such as the Internet. In such a case, the computer accesses one or more web servers 1330 via the Internet 1332.

Other components directed to gaming machine implementations include manners of gaming participant payment, and gaming machine payout. For example, a gaming machine including the computing arrangement 1300 may also include a hopper controller 1342 to determine the amount of payout to be provided to the participant. The hopper controller may be integrally implemented with the processor 1302, or alternatively as a separate hopper controller 1342. A hopper 1344 may also be provided in gaming machine embodiments, where the hopper serves as the mechanism holding the coins/tokens of the machine. The wager input module 1346 represents any mechanism for accepting coins, tokens, coupons, bills, electronic fund transfer (EFT), tickets, credit cards, smart cards, membership cards, etc., for which a participant inputs a wager amount.

Figure 14:
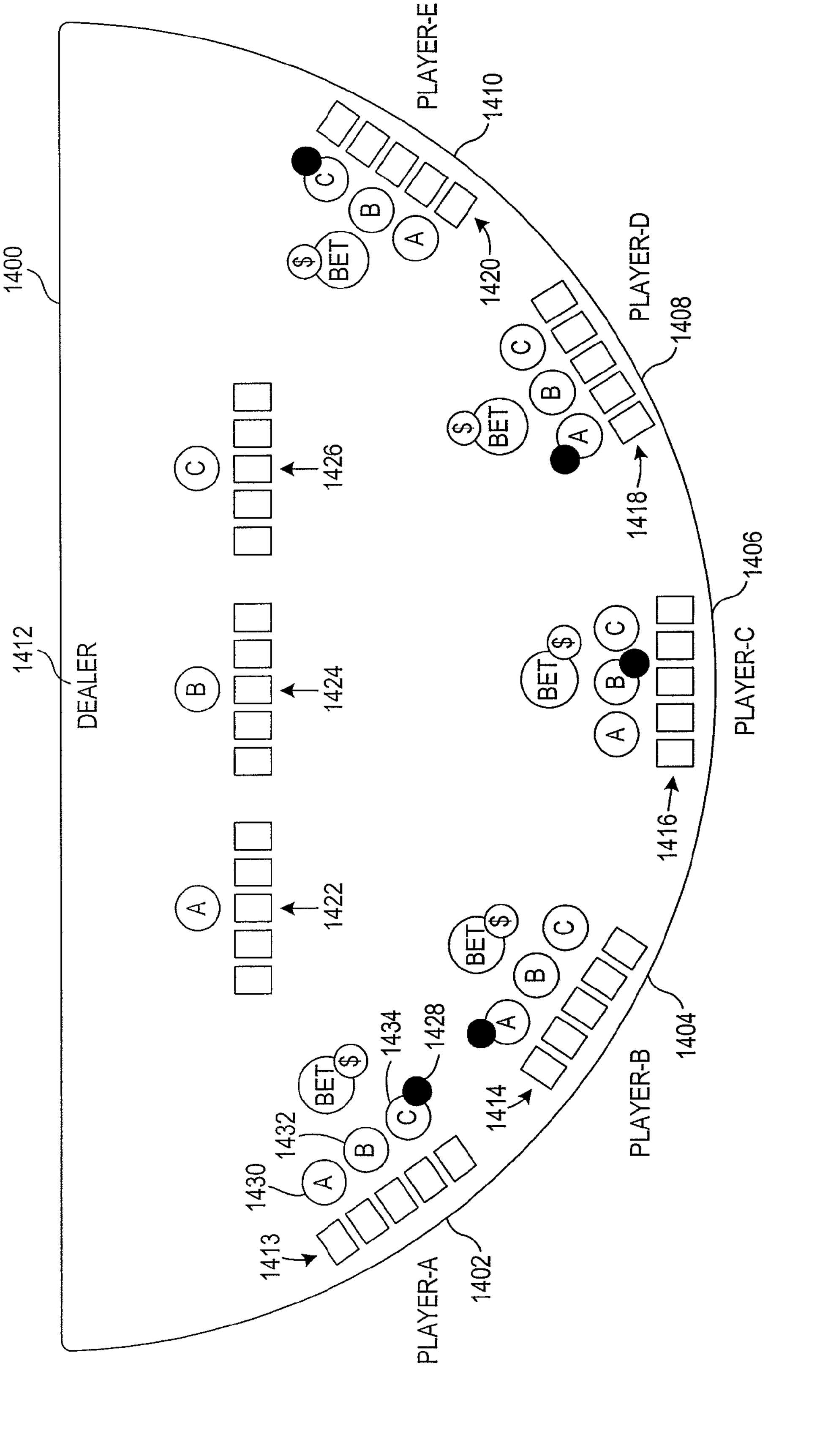
FIG. 14 illustrates a representative embodiment of a live table version incorporating the principles of the present invention.

A card game according to the present invention may be implemented in live table versions. An example table layout 1400 is illustrated in FIG. 14 for use as a gaming table cover or top surface in playing live casino versions of the poker game in accordance with the invention. The embodiment of FIG. 14 includes a plurality of player locations 1402, 1404, 1406, 1408, 1410 spaced around a periphery at which one or more players will situate themselves during play of the game. A dealer 1412 may deal one or more starting hands 1413, 1414, 1416, 1418, 1420 to each of the players. The players may hold particular cards of their respective starting hands in any conventional manner.

In accordance with one embodiment, the dealer provides a plurality of replacement hands 1422, 1424, 1426. Any number of replacement hands may be dealt. The player is provided with a manner of identifying which of the replacement hands is desired. Each replacement hand 1422, 1424, 1426 may be associated with an identifier, shown as "A," "B," and "C" in the illustrated embodiment. Each player may then identify which of the replacement hands A, B, or C is selected, such as by placing a token 1428 or associating some other item with corresponding selection areas, e.g., selection areas 1430, 1432, 1434 that may be labeled according to the replacement hand 1422, 1424, 1426 indicia. Such a selection identifies which of the replacement hands the particular player will use as his/her cards to replace those that were discarded from the starting hand.

Each player may require different numbers of replacement cards from the selected replacement hand. This may be accomplished in a variety of ways. For example, assume both player-A 1402 and player-E 1410 have selected replacement hand "C" 1426, but player-A 1402 requires three replacement cards and player-E 1410 requires only one replacement card. When the dealer 1412 begins turning the cards of replacement hand C 1426 face-up, the cards may be allocated in the order they are turned face-up. For example, player-E 1410 requires only one replacement card, so the first card of replacement hand 1426 turned face-up becomes player-E's replacement card. Since player-A 1402 requires three replacement cards, the first three cards of replacement hand C 1426 turned face-up become player-A's replacement cards. Other embodiments may also be implemented, such as allowing the players to select which of the cards of the selected replacement hand to use as his/her respective replacement cards. Many other variations may also be used.

Figure 15:
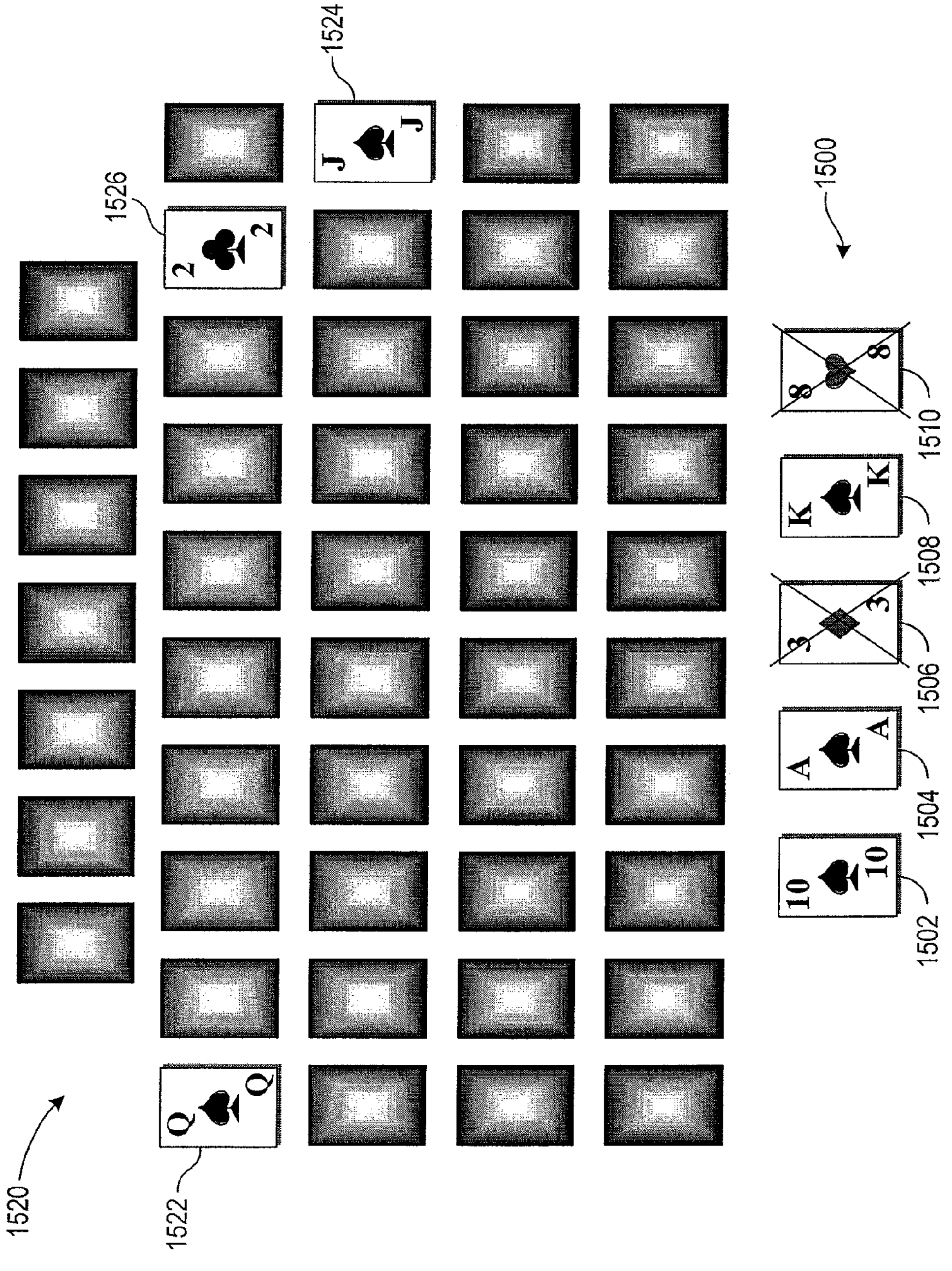
FIG. 15 illustrates an embodiment allowing the player to repeatedly select from the plurality of replacement hands until the player's resulting hand(s) is complete.

As previously described, one embodiment of the invention involves allowing the player to select one or more of the presented replacement hands to use in the completion of one or more resulting hands. The replacement "hands" or sets that are presented may include one or more cards. In one embodiment, each of the replacement hands may include one card, and the player is allowed to select the one-card replacement hands until his/her resulting hand(s) is complete. FIG. 15 illustrates such an embodiment, and illustrates an embodiment allowing the player to repeatedly select from the plurality of replacement hands until the player's resulting hand(s) is complete.

In the embodiment illustrated in FIG. 15, one starting hand 1500 is dealt or otherwise presented, although multiple starting hands may alternatively be provided. The starting hand 1500 includes five cards 1502, 1504, 1506, 1508, 1510 in the illustrated embodiment. For purposes of illustration, it is assumed that the player has held cards 1502 (10-Spades), 1504 (A-Spades), and 1508 (K-Spades), and the remaining cards 1506, 1510 are discarded or otherwise disregarded.

The embodiment of FIG. 15 involves presenting a plurality of replacement hands 1520, where each of the replacement hands includes one card. More particularly, the embodiment of FIG. 15 involves presenting each of the remaining cards in a standard 52-card deck, and allowing the player to select cards from the plurality of resulting hands 1520 until the hand 1500 is completed with replacement cards. Multiple decks could also be used, but a single 52-card deck is used in the illustrated embodiment. The player held three cards 1502, 1504, 1508, and therefore needs two replacement cards from the plurality of replacement hands 1520 to complete a five-card hand. Assume the player's first selection is card 1522, which is the Q-Spades. The player still needs one more card to complete the hand, and selects card 1524 which is the J-Spades. The resulting hand, including held cards 1502, 1504, 1508 and the selected replacement cards including cards 1522 and 1524, arrives at a royal flush (A, K, Q, J, 10 of Spades). In one embodiment, the non-selected cards of the plurality of resulting hands 1520 may be exposed. Such an embodiment allows the player to know that the desired cards to create a good resulting hand (e.g., a royal flush) are among the plurality of replacement hands 1520—the player just needs to select the right ones.

In alternative embodiments, the player may be allowed to select a greater number of the replacement hands 1520 than are required to complete the resulting hand. In such an embodiment, the player may be allowed to choose the best subset of the selected set of replacement cards to form the resulting hand. For example, in the illustration of FIG. 15, the player may have been allowed to select three of the cards from the plurality of replacement hands 1520, which may have included card 1526. Assume card 1526 was a 2-Clubs. The player then selects the two cards of the three selected (1522, 1524, 1526) that will form the best resulting hand. In this example, the player would designate cards 1522, 1524 from the three selected cards 1522, 1524, 1526 in order to form a royal flush. It is also noted that any one or more of the replacement hands 1520 may include more than one card if desired.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method of operating a gaming apparatus having a display, a user interface, and a processor, the method comprising:

presenting an initial hand of cards on the display;

facilitating, via the user interface, the selection of zero, one, or more of the presented cards of the initial hand;

receiving a final selection signal that the selection of zero, one, or more of the cards is final;

presenting a plurality of replacement hands after receiving the final selection signal using the processor, wherein each of the replacement hands includes at least a number of cards not selected when the final selection signal is received;

facilitating, via the user interface, the selection of at least one of the plurality of replacement hands; and discarding non-selected cards from the initial hand and inserting cards from the selected replacement hand to generate at least one final hand.

2. The method of claim 1, further comprising evaluating the final hand to determine prizes to award.

3. A method of operating a gaming apparatus having a display, a user interface, and a processor, the method comprising:

presenting an initial set of symbols on the display;

facilitating, via the user interface, the selection of zero, one, or more of the presented symbols of the initial set;

receiving a final selection signal that the selection of zero, one, or more of the symbols is final;

presenting a plurality of replacement symbol sets after receiving the final selection signal using the processor, wherein each of the replacement symbol sets includes at least a number of symbols not selected when the final selection signal is received;

facilitating, via the user interface, the selection of at least one of the plurality of replacement symbol sets; and removing non-selected symbols from the initial symbol set and inserting symbols from the selected replacement symbol set to generate at least one final symbol set.

4. The method of claim 3, wherein the gaming apparatus further includes a plurality of reels configured to be shown on the display, and wherein presenting an initial set of symbols on the display includes presenting symbols on at least one of the plurality of reels.

5. The method of claim 4, wherein presenting a plurality of replacement symbol sets after receiving the final selection signal using the processor includes presenting a plurality of replacement reel sets.

6. The method of claim 5, wherein each of the plurality of replacement reel sets includes a number of reels equal to a number of reels that were independent of the presentation of the initial set of symbols on the display.

7. The method of claim 5, wherein each of the plurality of replacement reel sets includes a number of reels less than a number of reels that were independent of the presentation of the initial set of symbols on the display.

8. The method of claim 4, wherein facilitating the selection of at least one of the plurality of replacement symbol sets includes facilitating the selection of multiple replacement reel sets.

9. The method of claim 5, wherein facilitating the selection of at least one of the plurality of replacement symbol sets includes selecting one of the plurality of replacement symbol sets.

10. The method of claim 9, wherein removing non-selected symbols from the initial symbol set and inserting symbols from the selected replacement symbol set to generate at least one final symbol set includes replacing the reels that were independent of the presentation of the initial symbol set with the replacement reels of the selected replacement reel set.

11. The method of claim 5, wherein the plurality of reels configured to be shown on the display are mechanical spinning reels.

12. The method of claim 11, wherein the plurality of replacement symbol sets are shown on a video display.

13. The method of claim 4, wherein the plurality of reels configured to be shown on the display are virtual spinning reels shown on a video display.

14. The method of claim 1, wherein each of the replacement hands include independently selected cards that are combinable with the selected cards in the initial hand to form a plurality of different possible final hands.

15. The method of claim 1, wherein receiving a final selection signal includes receiving a signal from a mechanism on the user interface that indicates a draw command in a draw poker game.

16. The method of claim 1, wherein each of the plurality of replacement hands includes the same number of replacement cards.

17. The method of claim 1, wherein presenting a plurality of replacement hands includes presenting at least one card in each of the replacement hands face down.

18. The method of claim 17, wherein the at least one card of the at least one selected replacement hand is revealed when it is used to generate the at least one final hand.

19. The method of claim 18, further comprising revealing card values of the non-selected replacement hands after a selection of at least one of the plurality of replacement hands is completed.

20. The method of claim 1, wherein presenting an initial hand of cards includes presenting five cards as a dealt hand in a draw poker game.

* * * * *